US 7,150,793 B2

(12) United States Patent
Sanders

(10) Patent No.: US 7,150,793 B2
(45) Date of Patent: *Dec. 19, 2006

(54) METHOD OF REDUCING MATERIALS CONTAINED IN JUICE

(75) Inventor: David O. Sanders, Loveland, CO (US)

(73) Assignee: Nalco Company, Naperville, IL (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/723,519

(22) Filed: Nov. 26, 2003

(65) Prior Publication Data
US 2004/0105924 A1 Jun. 3, 2004

Related U.S. Application Data

(63) Continuation of application No. 10/125,120, filed on Apr. 15, 2002, now Pat. No. 6,656,287.

(51) Int. Cl.
C13D 3/12 (2006.01)
C13D 3/02 (2006.01)

(52) U.S. Cl. ............................ 127/52; 127/48; 127/50; 127/53

(58) Field of Classification Search ................ 127/48, 127/50, 52, 53
See application file for complete search history.

(56) References Cited

U.S. PATENT DOCUMENTS

| 1,043,102 A | 11/1912 | Heesemann et al. | |
| 1,578,463 A | 3/1926 | Nicholson et al. | |
| 1,598,787 A | 9/1926 | Shields et al. | |
| 1,815,276 A | 7/1931 | Schwieger et al. | |
| 2,164,186 A | 6/1939 | Brown et al. | |
| 2,547,298 A | 4/1951 | Wiklund | 127/50 |
| 2,557,800 A | 6/1951 | Seaillis et al. | 127/52 |
| 2,672,330 A | 3/1954 | Swenson | |
| 2,697,049 A | 12/1954 | Breighel-Miiller | 127/50 |
| 2,757,582 A | 8/1956 | Freeman et al. | 92/28 |
| 2,774,693 A | 12/1956 | Breighel-Miiller et al. | 127/50 |
| 2,824,028 A | 2/1958 | Zenzes | 127/50 |
| 2,977,253 A | 3/1961 | Grandadam et al. | 127/50 |
| 2,985,589 A | 5/1961 | Broughton et al. | 210/34 |
| 3,007,542 A | 11/1961 | Giampapa et al. | 183/2.5 |
| 3,070,935 A | 1/1963 | De Leon | 55/170 |
| 3,089,789 A | 5/1963 | Van Note et al. | 127/50 |
| 3,113,044 A | 12/1963 | Alston | 127/48 |
| 3,168,419 A | 2/1965 | Gale | 127/50 |
| 3,201,919 A | 8/1965 | Long et al. | 55/46 |
| 3,358,425 A | 12/1967 | Burnham, Sr. | 55/193 |
| 3,618,589 A | 11/1971 | Tavani | 127/46 |
| 3,734,773 A | 5/1973 | Haley | 127/48 |
| 3,785,863 A | 1/1974 | Devillers et al. | 127/9 |
| 3,977,972 A | 8/1976 | Bloch et al. | 210/63 R |
| 4,081,288 A | 3/1978 | Torres | 127/48 |
| 4,083,732 A | 4/1978 | Paley | 127/48 |
| 4,116,712 A | 9/1978 | Othmer | |
| 4,123,800 A | 10/1978 | Mazzei | 366/150 |
| 4,140,541 A | 2/1979 | Popper | 127/46 |
| 4,182,633 A | 1/1980 | Ishikawa et al. | 127/46 |
| 4,196,017 A | 4/1980 | Melville et al. | 127/41 |
| 4,288,551 A | 9/1981 | Gudnason et al. | 435/168 |
| 4,312,678 A | 1/1982 | Landis | 127/46.2 |
| 4,331,483 A | 5/1982 | Mirabel et al. | 127/46.2 |
| 4,332,622 A | 6/1982 | Hohnerlein, Jr. et al. | 127/41 |
| 4,345,947 A | 8/1982 | Rundell et al. | 127/48 |
| 4,352,680 A | 10/1982 | Hackler | 55/48 |
| 4,382,823 A | 5/1983 | Gudnason | 127/57 |
| 4,412,866 A | 11/1983 | Schoenrock et al. | 127/46.2 |
| 4,421,568 A | 12/1983 | Huibers | 127/48 |
| 4,432,806 A | 2/1984 | Madsen et al. | 127/48 |
| 4,478,645 A | 10/1984 | Gudnason | 127/57 |
| 4,492,601 A | 1/1985 | Nakasone et al. | 127/48 |
| 4,534,774 A | 8/1985 | Leccofre et al. | 55/44 |
| 4,534,800 A | 8/1985 | Winstrom-Olsen | 127/12 |
| 4,785,794 A | 11/1988 | Jo et al. | 127/46.1 |
| 4,795,494 A | 1/1989 | Toth et al. | 127/48 |
| 5,102,553 A | 4/1992 | Kearney et al. | 210/659 |
| 5,110,363 A | 5/1992 | Clarke et al. | 127/46.1 |
| 5,122,166 A | 6/1992 | Hyrcyk et al. | 55/38 |
| 5,190,665 A | 3/1993 | Titmas et al. | 210/743 |
| 5,202,032 A | 4/1993 | Shoemaker | 210/718 |
| H1206 H | 7/1993 | Thibodeaux et al. | 55/90 |
| 5,262,328 A | 11/1993 | Clarke et al. | 436/17 |
| 5,314,613 A | 5/1994 | Russo | 208/184 |
| 5,320,681 A | 6/1994 | Moc et al. | 127/46.1 |
| 5,338,341 A | 8/1994 | Mazzei et al. | 96/208 |
| 5,352,276 A | 10/1994 | Rentschler et al. | 95/246 |
| 5,403,475 A | 4/1995 | Allen | 210/168 |
| 5,480,490 A | 1/1996 | Toth et al. | 127/42 |
| 5,504,196 A | 4/1996 | Clarke Garegg et al. | 536/17.2 |
| 5,614,086 A | 3/1997 | Hill et al. | 210/170 |
| 5,674,312 A | 10/1997 | Mazzei | 95/261 |

(Continued)

OTHER PUBLICATIONS

Perry et al, Chemcial Engineer's Handbook, 5th edition, p. 14-2, McGraw-Hill Book Company, New York, 1973.*

(Continued)

Primary Examiner—David M. Brunsman
(74) Attorney, Agent, or Firm—William J. Maheras; Thomas M. Breininger

(57) ABSTRACT

A process system that uses a reduced amount of lime or other base to clarify or purify juice obtained from plant material such as sugar cane, sugar beets, or sweet sorghum. Specifically, apparatus and methods to reduce volatile materials in juice providing a product that has an increased pH requiring the use of less lime or other base to achieve the desired pH values for clarification or purification.

68 Claims, 7 Drawing Sheets

U.S. PATENT DOCUMENTS

| | | |
|---|---|---|
| 5,759,283 A | 6/1998 | Ekern et al. .................. 127/42 |
| 5,846,333 A | 12/1998 | Partida et al. ................ 127/37 |
| 5,865,899 A | 2/1999 | Theoleyre et al. ............ 127/42 |
| 5,928,429 A | 7/1999 | Duncan et al. ............... 127/48 |
| 5,932,016 A | 8/1999 | Paananen et al. ............. 127/48 |
| 6,051,075 A | 4/2000 | Kochergin et al. ............ 127/42 |
| 6,123,750 A | 9/2000 | Espinal ....................... 95/245 |
| 6,174,378 B1 | 1/2001 | Donovan et al. ............. 127/55 |
| 6,193,893 B1 | 2/2001 | Mazzei et al. .............. 210/702 |
| 6,277,175 B1 | 8/2001 | Halder et al. ................ 95/246 |
| 6,656,287 B1 * | 12/2003 | Sanders ....................... 127/53 |

OTHER PUBLICATIONS

James C.P. Chen and Chung ChiChou, "Cane Sugar Handbook: A Manual for Cane Sugar Manufactures and Their Chemists", 12$^{th}$ Edition (1993), no month provided.

McGinnis, R.A, "Beet Sugar Technology" Third Edition (1982), no month provided.

van der Poel, et al., "Sugar Technology, Beet and Cane Sugar Manufacture" (1998), no month provided.

* cited by examiner

METHOD OF REDUCING MATERIALS CONTAINED IN JUICE

This application is a continuation of U.S. application Ser. No. 10/125,120, filed Apr. 15, 2002, now U.S. Pat. No. 6,656,287 issued Dec. 2, 2003.

The present invention relates to a process system for the production of sugar along with other products from sucrose containing juice obtained from plant material, such as, sugar cane, sugar beets, or sweet sorghum. The invention further relates to apparatus and methods to produce sucrose containing juice having a reduced amount of dissolved material. The invention further relates to the conversion of conventional sugar process systems to produce or to utilize such sucrose containing juices that have a reduce amount of dissolved materials.

I. BACKGROUND

Sucrose, $C_{12}H_{22}O_{11}$, a disaccharide, is a condensation molecule that links one glucose monosaccharide and one fructose monosaccharide. Sucrose occurs naturally in many fruits and vegetables of the plant kingdom, such as sugarcane, sugar beets, sweet sorghum, sugar palms, or sugar maples. The amount of sucrose produced by plants can be dependent on the genetic strain, soil or fertilization factors, weather conditions during growth, incidence of plant disease, degree of maturity or the treatment between harvesting and processing, among many factors.

Sucrose may be concentrated in certain portions of the plant, for example, the stalks of the sugarcane plant or the sugar beet root. The entire plant, or a portion of the plant in which the sucrose is concentrated, may be harvested and the plant juices may be removed or extracted to obtain a juice containing a certain concentration of sucrose. Typically, the removal or extraction of juices from plant material involves milling, diffusion, pressing, or a combination thereof. Milling is one of the conventional methods for extracting juice from sugar cane stalks. The sugar cane stalks may be cut up into pieces having the desired size and then passed through rollers to squeeze out the juices. This process may be repeated several times down a series of mills to ensure that substantially all the sugar cane juice is removed.

Diffusion is considered to be the conventional method for extracting juice from the root of the sugar beet. Sugar beets may be sliced into thin strips called "cossettes" that may then be introduced into one end of a diffuser while a diffusion liquid, such as warm water, enters the other. When such counter current processing is used about 98 percent of the sucrose from the cossette or sugar beet material can be removed. The resulting sucrose containing liquid is often called "diffusion juice." The cossettes or beet slices from the diffuser can still be very wet and the juice, which can be 88–92% water, associated with them can still hold some sucrose. The cossettes or beet slices may, therefore, be pressed in a screw press, or other type of press, to squeeze as much juice out of them as possible. This juice often referred to as "pulp press water" can have a pH value of about 5 and in some cases is returned to the diffuser. The resulting pulp may contain about 75% moisture. The addition to the press feed of cationic charged pressing aids can lower the pulp moisture content by about 1.5 to 2%. Sucrose from sugarcane stalks can also be removed by diffusion. One diffusion process for sugarcane involves a moving bed of finely prepared sugarcane pieces passed through the diffuser allowing the sucrose to be leached out of the sugarcane.

The diffusion process, the milling process, other processes that remove juice from plant material, or bring plant juice into aqueous solution, result in a juice containing sucrose, non-sucrose substances, and water. The nature and amount of the non-sucrose substances in the juice obtained by these processes can vary and may include all manner of plant derived substances and non-plant derived substances, including but not limited to: insoluble material, such as, plant fiber or soil particles; and soluble materials, such as, fertilizer, sucrose, saccharides other than sucrose, organic and inorganic non-sugars, organic acids, dissolved gases, proteins, inorganic acids, organic acids, phosphates, metal ions (for example, iron, aluminum, or magnesium ions), pectins, colored materials, saponins, waxes, fats, or gums, their associated or linked moieties, or derivatives thereof.

These non-sucrose substances are often highly colorized, thermally unstable, or otherwise interfere with certain processing steps or adversely impact the quality or quantity of the sugar product resulting from the purification process. It has been estimated that on average one pound of non-sucrose substances reduces the quantity of sugar product resulting from the purification process by one and one-half pounds. It may be desirable to have all or a portion of these non-sucrose substances separated from or removed from the juice resulting from the diffusion, milling, or other methods used to remove juice from the plant material. A good diffusion operation can eliminate 25–30% of entering impurities. Returned pulp or carbonation press water can reduce this level to 17–20%, however it is still economical due to: heat recovery, make up water saved, wastewater pollution reduced, sugar recovered.

Conventional process systems utilize the remaining plant material, or the juice(s) resulting from the diffusion, milling, or other methods used to remove juice from the plant material, such as those described by U.S. Pat. Nos. 6,051,075; 5,928,42; 5,480,490, each hereby incorporated by reference, or such as those described by "Sugar Technology, Beet and Cane Sugar Manufacture" by P. W. van der Poel et al. (1998); "Beet-Sugar Technology" edited by R. A. McGinnis, Third Edition (1982); or Cane Sugar Handbook: A Manual for Cane Sugar Manufacturers and Their Chemists by James C. P. Chen, Chung Chi Chou, 12th Edition (1993), each hereby incorporated by reference herein, to generate various types of: process juices; solids prepared from the remaining plant material or separated from such process juices during their clarification, purification or refining; sugar or sucrose containing juices; sugar or sucrose crystallized from such sugar or sucrose containing juices; mother liquors of such crystallization of sugar or sucrose, along with the various combinations, permutations, by products, or derivative products thereof, each having a level of impurities consistent with the process steps described herein or any portion thereof, or actually utilized in their production, or consistent with conventional standards for a type or kind of product including, but not limited to: animal feeds containing plant material from which juice has been removed such as exhausted beet cossettes, pulp, bagasse, or other solids or juices separated from process juices; power generated using plant material from which juice has been removed as a fuel to boil water to generate high pressure steam to drive turbine(s) in order to make electricity, or to generate low pressure steam for the process system, or to generate low grade heat; syrup ranging from pure sucrose solutions such as those sold to industrial users to treated syrups incorporating flavors and colors, or those incorporating some invert sugar to prevent crystallization of sucrose, for example, golden syrup; molasses obtained by removal of all or any part of the crystallizable sucrose or sugar, or products derived from molasses, one example being treacle; alcohol distilled from molasses; blanco directo or plantation sugars generated by sulfitation using sulfur dioxide (SO2) as a bleaching agent; juggeri or gur generated by boiling sucrose or sugar containing juices until essentially dry; juice sugar from melting refined white sugar or from syrup(s) which may be further decolorized; single-crystallization cane sugars often referred to as "unrefined sugar" in the United Kingdom or other parts of Europe, or referred to as "evaporated cane juice" in the North American natural foods industry to describe a free-flowing, single-crystallization cane sugar that is produced with a minimal degree of processing; milled cane; demerara; muscovado; rapedura; panela; turbina; raw sugar which can be 94–98 percent sucrose, the balance being molasses, ash, and other trace elements; refined sugars such as extra fine granulated having a quality based upon "bottlers" quality specified by the National Soft Drink Association being water white and at least 99.9 percent sucrose; specialty white sugars, such as, caster sugar, icing sugar, sugar cubes, or preserving sugar; brown sugars that can be manufactured by spraying and blending white refined sugar with molasses which can be light or dark brown sugar depending on the characteristics of the molasses; or powdered sugar made in various degrees of fineness by pulverizing granulated sugar in a powder mill and which may further contain corn starch or other chemicals to prevent caking. This list is not meant to be limiting with respect to the products generated from conventional sugar process systems, but rather, it is meant to provide a few examples of the enormous variety of sugar process system products that are generated.

As can be understood, conventional process systems, in part, comprise steps that increasingly clarify, purify, or refine juice(s) resulting from the diffusion, milling, or other methods used to remove juice from the plant material. Typically, a portion of the insoluble or suspended material in sucrose containing juice derived from plant material can be removed using one or more mechanical processes such as screening. The resulting screened juice, when derived from sugar beets, for example, may contain about 82%–85% by weight water, about 13–15% by weight sucrose, about 2.0–3.0% by weight dissolved non-sucrose substances or impurities, and some amount of remaining insoluble materials.

Typically, the resulting sucrose containing juice or juices, which can have a volume of 1000–2500 gallons per minute, may be treated by the gradual addition of base to increase the pH of the juice. In certain conventional process systems, the pH of the juice may be raised from between about 5.5 pH to about 6.5 pH up to between about 11.5 pH to about 11.8 pH to enable certain non-sucrose substances contained in such juices to reach their respective iso-electric points. This step is often referred to as "preliming". However, the subsequent use of this term is not meant to limit the step of adding base to sucrose containing juice or juices solely to those process systems that refer to this addition of base as "preliming". Rather it should be understood that in the various conventional juice process systems it may be desirable to first utilize base to raise pH of juice prior to a subsequent process step, such as a filtration step, as described by U.S. Pat. Nos. 4,432,806, 5,759,283, or the like; an ion exchange step as described in British Patent No. 1,043,102, or U.S. Pat. Nos. 3,618,589, 3,785,863, 4,140,541, or 4,331,483, 5,466,294, or the like; a chromatography step as described by U.S. Pat. Nos. 5,466,294, 4,312,678, 2,985,589, 4,182,633, 4,412, 866, or 5,102,553, or the like; or an ultrafiltration step as described by U.S. Pat. No. 4,432,806, or the like; phase separation as described by U.S. Pat. No. 6,051,075, or the like; process systems that add active materials to the final carbonation vessel as described by U.S. Pat. No. 4,045,242, that may be an alternative to the conventional juice process steps of main liming and carbonation, each reference hereby incorporated by reference herein.

The use of the term "base" involves the use materials that are capable of increasing the pH of a juice including, but not limited to the use of lime or the underflow from processes that utilize lime. The use of the term "lime" typically involves the specific use of quick lime or calcium oxides formed by heating calcium (generally in the form of limestone) in oxygen to form calcium oxide. Milk of lime is preferred in many juice process systems, and consists of a suspension of calcium hydroxide ($Ca(OH)_2$) in accordance with the following reaction:

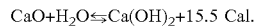

$$CaO+H_2O \leftrightarrows Ca(OH)_2+15.5 \text{ Cal.}$$

The term "iso-electric point" involves the pH at which dissolved or colloidal materials, such as proteins, within the juice have a zero electrical potential. When such dissolved or colloidal materials reach their designated iso-electric points, they may form a plurality of solid particles, flocculate, or flocs.

Flocculation may be further enhanced by the addition of calcium carbonate materials to juice, which functionally form a core or substrate with which the solid particles or flocculates associate. This process increases the size, weight or density of the particles, thereby facilitating the filtration or settling of such solid particles or materials and their removal from the juice.

The resulting mixture of juice, residual lime, excess calcium carbonate, solid particles, flocculants, or flocs, may then be subjected to subsequent process steps as described above. Specifically, with regard to the process system for the clarification, purification, or refining of juices generated by the prior processing of sugar beets, the mixture may first be subjected to a cold main liming step to stabilize the solids formed in the preliming step. The cold main liming step may involve the addition of about another 0.3–0.7% lime by weight of prelimed juice (or more depending on the quality of the prelimed juice) undertaken at a temperature of between about 30 degrees Centigrade to about 40 degrees Centigrade.

The cold main limed juice may then be hot main limed to further degrade invert sugar and other components that are not stable to this step. Hot main liming may involve the further addition of lime to cause the pH of the limed juice to increase to a level of between about 12 pH to about 12.5 pH. This results in a portion of the soluble non-sucrose materials that were not affected by preceding addition of base or lime to decompose. In particular, hot main liming of the limed juice may achieve thermostability by partial decomposition of invert sugar, amino acids, amides, and other dissolved non-sucrose materials.

After cold or hot main liming, the main limed juice can be subjected to a first carbonation step in which carbon dioxide gas can be combined with the main limed juice. The carbon dioxide gas reacts with residual lime in the main limed juice to produce calcium carbonate in the form of precipitate. Not only may residual lime be removed by this procedure (typically about 95% by weight of the residual lime), but also the surface-active calcium carbonate precipitate may trap substantial amounts of remaining dissolved non-sucrose substances. Furthermore, the calcium carbonate precipitate may function as a filter aid in the physical removal of solid materials from the main limed and carbonated juice.

The clarified juice product obtained from the first carbonation step may then be subjected to additional liming steps, heating steps, carbonation steps, filtering steps, membrane ultrafiltration steps, chromatography separation steps, or ion exchange steps as above described, or combinations, permutations, or derivations thereof, to further clarify or purify the juice obtained from the first carbonation step resulting in a process juice often referred to as "thin juice".

This further clarified juice or "thin juice" may be thickened by evaporation of a portion of the water content to yield a product conventionally referred to as "syrup". Evaporation of a portion of the water content may be performed in a multi-stage evaporator. This technique is used because it is an efficient way of using steam and it can also create another, lower grade, steam which can be used to drive the subsequent crystallization process, if desired.

The thickened clarified juice or "syrup" can be placed into a container, which may typically hold 60 tons or more. In the container, even more water is boiled off until conditions are right for sucrose or sugar crystals to grow. Because it may be difficult to get the sucrose or sugar crystals to grow well, some seed crystals of sucrose or sugar are added to initiate crystal formation. Once the crystals have grown the resulting mixture of crystals and remaining juice can be separated. Conventionally, centrifuges are used to separate the two. The separated sucrose or sugar crystals are then dried to a desired moisture content before being packed, stored, transported, or further refined, or the like. For example, raw sugar may be refined only after shipment to the country where it will be used.

There is a competitive global commercial market for the products derived from sucrose containing plant materials and juices. The market for products produced from sucrose containing plant material has sufficient size that even a slight reduction in the cost of a single process system step can yield a substantial and desired monetary savings. As such, there is great incentive to perform research in sugar or juice process systems by the sugar industry to yield process system savings, by independent researchers and by distributors who may be paid for novel process system chemicals and equipment, and in some cases have a further incentive by additional payments based upon a percentage of the savings within the process when improvements are made.

However, even though process systems for the purification of sucrose containing juices from certain plant materials have been established and improved upon for at least 1000 years, and specifically with regard to sugar beets, there have been commercial process systems for more than 100 years, and even though there is great incentive to generate improvements within sugar or juice process systems, significant problems with regard to the processing of juices obtained from plant material remain.

A significant problem with conventional sugar processing systems can be the expense of obtaining and using base, such as calcium oxide, to raise the pH of the sucrose containing liquids or juice(s) obtained from plant materials. As discussed above, calcium oxide or calcium hydroxide may be added to juice to raise the pH allowing certain dissolved materials to come out of solution as solids, flocculent, or flocs. Calcium oxide is typically obtained through calcination of limestone a process in which the limestone is heated in a kiln in the presence of oxygen until carbon dioxide is released resulting in calcium oxide.

As shown by FIG. 5, calcination can be expensive because it requires the purchase of the kiln (40), limestone (41), and fuel (42), such as gas, oil, coal, coke, or the like, that can be combusted to raise the temperature of the kiln sufficiently to release carbon dioxide (43) from the limestone (41). Ancillary equipment to transport the limestone and the fuel to the kiln and to remove the resulting calcium oxide from the kiln must also be provided along with equipment to scrub certain kiln gases and particles from the kiln air exhausted during calcination of the limestone. Naturally, labor must be provided to operate and maintain the equipment, as well as, monitor the quality of the calcined limestone generated and also to monitor the clean up of gases and particulates released during operation of the kiln.

Additionally, the calcium oxide generated by calcination must be converted to calcium hydroxide for use in typical juice process systems. Again this involves the purchase of equipment to reduce the calcium oxide to suitably sized particles and to mix these particles with water to generate calcium hydroxide. Again, labor must be provided to operate and maintain this equipment.

Finally, the investment in equipment and labor associated with the use of calcium oxides incrementally increases as the amount used increases. This may involve the incremental expenditure for the additional labor to mix additional amounts of calcium hydroxide with juice, or it may involve an incremental expenditure to use equipment having greater loading capacity or having greater power, or the like.

Another significant and related problem with the production of and use of base in conventional process systems can be disposal of excess base or the products formed when the base reacts with organic acids or inorganic acids dissolved in the juice. For example, when the process system uses one or more carbonation steps in clarifying or purifying juice, the amount of calcium carbonate or other salts formed, often referred to as "spent lime", will be proportionate to the amount of lime added to the juice. Simply put, the greater the amount of lime added to the juice, generally the greater the amount of precipitates formed during the carbonation step The "carbonation lime" may be allowed to settle to the bottom of the carbonation vessel forming what is sometimes referred to as a "lime mud". The lime mud can be separated by a rotary vacuum filter or plate and frame press. The product formed is then called "lime cake". The lime cake or lime mud may largely be calcium carbonate precipitate but may also contain sugars, other organic or inorganic matter, or water. These separated precipitates are almost always handled separately from other process system wastes and may, for example, be slurried with water and pumped to settling ponds or areas surrounded by levees or transported to land fills.

Alternately, the carbonation lime, lime mud, or lime cake can be recalcined. However, the cost of a recalcining kiln and the peripheral equipment to recalcine spent lime can be substantially more expensive than a kiln for calcining limestone. Furthermore, the quality of recalcined "carbonation lime" can be different than calcined limestone. The purity of calcined limestone compared to recalcined carbonation lime may be, as but one example, 92% compared with 77%. As such, the amount of recalcined lime required to neutralize the same amount of hydronium ion in juice may be correspondingly higher. Also, the carbon dioxide content of spent lime can be much higher than limestone. As such, not only can recalcined lime be expensive to generate, it can also require the use of substantially larger gas conduit and equipment to transfer the generated $CO_2$ from recalcining spent lime, larger conveying equipment to move the recalcined lime, larger carbonation tanks, or the like.

Also whether spent lime is disposed of in ponds, landfills, or by recycling, the greater the amount of lime utilized in a particular process system, generally the greater the expense of disposing the spent lime.

Another significant problem with conventional sugar processing systems may be an incremental decrease in process system throughput corresponding with an incremental increase in the amount of lime used in processing juice(s). One aspect of this problem may be that there is a limit to the amount of or rate at which lime can be produced or provided to juice process steps. As discussed above, lime stone must be calcined to produce calcium oxide prior to its use as a base in juice process systems. The amount of lime produced may be limited in by availability of limestone, kiln capacity, fuel availability, or the like. The rate at which lime can be made available to the juice process system may vary based on the size, kind, or amount of the lime generation equipment, available labor, or the like. Another aspect of this problem can be that the amount of lime used in the process system may proportionately reduce volume available for juice in the process system. Increased use of base, such as lime, may also require the use of larger containment areas, conduits, or the like to maintain throughput of the same volume of juice.

Another significant problem with conventional sugar processing systems may be excess acids within plant material generated prior to extraction of the plant juice. Organic acids act as a buffering system in the acid-base equilibrium of the plant cell, in order to maintain the required pH value in the plant tissue. The origin of these acids can be divided into two groups, the first, are acids taken up by the plant from the soil in the course of the growing cycle, and the second, are acids formed by biochemical or microbial processes. When the uptake of acids from the soil is insufficient, plants may synthesize organic acids, primarily oxalic acid, citric acid and malic acid, to maintain a healthy pH value of the plant cell juice. As such, juice extracted from the plant tissue will contain a certain amount of various organic acids.

In addition to this naturally occurring amount of organic acids within the plant tissue, acids may be formed during storage primarily by microbial processes. Badly deteriorating plant material may generate large amounts of organic acids, primarily lactic, acetic acid, as well as citric acid. The total acid content within the plant tissue can increase threefold, or more, under certain circumstances.

Moreover, carbon dioxide ($CO_2$) can be generated in the plant tissues due to breakdown of the natural alkalinity in the juice. In this process, bicarbonate ion and carbonate ion are converted to carbon dioxide. The resulting carbon dioxide to the extent it remains in solution generates carbonic acid that provides a source of hydronium ion. Organic acids contained within the plant cell juice, in whole or in part, remain within the juice obtained from the plant material. As such, to raise the pH of the juice, these organic and inorganic acids must be neutralized with base. The higher the concentration of organic acids or inorganic acids within the juice, the greater the amount of base that may be necessary to raise the pH of the juice to a desired value.

Another significant problem with conventional sugar processing systems may be that plant materials or juice(s) treated with antimicrobial chemicals can have higher acid content then untreated plant materials or juices. For example, sulfur dioxide ($SO_2$) or ammonium bisulfite ($NH_4HSO_3$) can be added continuously or intermittently to help control microbial growth or infection. The amount of $SO_2$ added depends on the severity of the microbial growth or infection. Lactic acid and nitrite levels can be monitored or tracked to determine severity of growth or infection. Up to about 1000 ppm of $SO_2$ can be used to shock or treat an infected system. Up to 400–500 ppm can be fed continuously to control an infection. The $SO_2$ or $NH_4HSO_3$ addition used for antimicrobial protection can lower the pH and alkalinity of juice(s). The alkalinity reduction may occur due to conversion of naturally occurring bicarbonate ions to $CO_2$ and carbonic acid.

Another significant problem with conventional sugar processing systems may be the formation of scale in containment vessels, such as, evaporators or sugar crystallization equipment. The calcium salt of oxalic acid often forms the main component of scale. Oxalate has low solubility in solution and that solubility can be reduced as the amount of calcium in solution increases. Even after juice purification to "thin" or "thick" juices there can be sufficient calcium in solution to force oxalate out of solution. The process of removing scale from the surfaces of equipment can be expensive, including, but not limited to, costs due to production slowdowns and efficiency losses, or the reduction in the effective life of equipment.

Another significant problem with convention sugar processing systems may be the lack of recognition that juice extraction equipment or processes used to obtain juice from plant material can alter or reduce the pH of the extracted juice. With respect to diffusers used to extract juice from sugar beet material, there may have been a failure to recognize that the pH value of sugar beet juice can be altered or reduced during the diffusion process. Another aspect of this-problem may be that there may be a lack of recognition that different apparatus or different methods used to diffuse juice from sugar beet material alters or reduces the pH of the juice obtained differentially. To the extent that improvements in diffusion technology have generally resulted in increasingly lower pH values of the juice obtained, these apparatuses and methods teach away from the solutions provided by the invention.

The present invention provides a juice process system involving both apparatuses and methods that address each of the above-mentioned problems.

II. SUMMARY OF THE INVENTION

Accordingly, a broad object of the invention can be to provide a juice process system to generate products from sucrose containing liquids or juices obtained from plant material. One aspect of this broad object can be to provide an alternative juice process system methods to conventional juice or sugar process system methods. As such, the invention can provide an entire process system, including both apparatus and methods, to generate products from sucrose containing liquids or juice. A second aspect of this broad object can be to provide juice process system methods compatible with conventional juice or sugar process system methods. As to this object, the invention provides method steps and apparatus that can be further added to, replace, or modify conventional methods and apparatus used to process sucrose containing liquids or juice(s).

A second broad object of the invention can to reduce the cost of generating products from sucrose containing liquids or juices. One aspect of this object of the invention can be to increase juice process throughput that may be, in whole or in part, limited by availability of base, such as a reduced availability of limestone or the a lack of capacity to convert limestone to calcium oxide, or the like. Another aspect of this object can be to provide a cost savings by reducing the amount of base, such as lime, that has to be used to process sucrose containing liquids or juice into products. A third aspect of this object of the invention can be to reduce the amount of waste generated, such as a reduction in the amount of spent lime.

A third broad object of the invention can be to provide a sucrose containing liquid product or juice product resulting from use of the invention. One aspect of this object can be to provide a sucrose containing liquid or juice product having a reduced amount or reduced concentration of dissolved material,. such as aqueous acids, volatile organic compounds, dissolved gases (e.g. $CO_2$ or $SO_S$), ammonia, or the like. A second aspect of this object can be to provide a sucrose containing liquid or juice product that has a higher pH value after treatment in accordance with the invention. A third aspect of this object can be to provide a sucrose containing liquid or juice product that has a higher pH value after treatment in accordance with the invention without the use of any base. A fourth aspect of the invention can be to provide a sucrose containing liquid or juice product that has a higher pH even when an amount of base, such as lime, or the underflow from conventional processing of juice, or the like, has been added prior to treatment in accordance with the invention. A fifth aspect of this object can be to provide a sucrose containing liquid product or juice product that has a reduced capacity to generate hydronium ion. A sixth aspect of this object of the invention can be to provide a sucrose containing liquid or juice product that requires less base to raise the pH to a desired value, iso-electric focus dissolved material(s), perform preliming or main liming steps in conventional process systems, degrade invert sugars, or otherwise generate products from sucrose containing liquids or juices.

Another fourth broad object of the invention can be to provide methods and apparatus that reduce the amount or concentration of dissolved material in juice obtained from plant material by conventional juice extraction procedures such as pressing, milling, or diffusion. One aspect of this object can be to provide a method of reducing the amount or concentration of dissolved material without the addition of base, necessitating the addition of base, or prior to the addition of base. A second aspect of this object can be to provide a method that can be used prior to, in conjunction with, or after, the addition of base to sucrose containing liquids or juices to reduce the amount or concentration of dissolved material in such juice. A third aspect of this object can be to provide a method that assists in reducing the amount or concentration of dissolved materials in sucrose containing liquid or juice. A fourth aspect of this object can be to provide a method of reducing dissolved material in sucrose containing liquids or juices compatible with conventional juice clarification or purification methods, including but not limited to, preliming, main liming, ion exchange, or filtering, as above described.

A fifth broad object of the invention can be to provide various apparatus and methods to increase the area of interface between the sucrose containing liquid or juice and a desired partial pressures of gases.

A sixth broad object of the invention can be to provide various apparatus that inject, introduce, or otherwise mix desired partial pressures of gases with juice obtained from plant material. One aspect of this object can be to provide apparatus to introduce a mixture of gases into juice to provide a mixed stream of juice comprising the juice and the desired partial pressures of gases.

A seventh broad object of the invention can be to provide various apparatus to separate or remove mixtures of gases having come to partial or complete equilibrium with the dissolved material, or partial pressures of gases contained by, or dissolved within, the juice.

Naturally, further objects of the invention are disclosed throughout other areas of the specification and drawings.

III. BRIEF DESCRIPTION OF THE DRAWINGS

FIG. 1 shows a particular embodiment of the invention to reduce dissolved material in juice obtained from plant material that includes a juice transfer means having a mixture of gases being delivered to the juice to generate a mixed stream of juice with the mixture of gases, which can further include a gas distribution element, such as channels or grooves within the juice transfer means, or the impellor of a pump.

IV. DETAILED DESCRIPTION OF THE PREFERRED EMBODIMENTS

Figure 1:
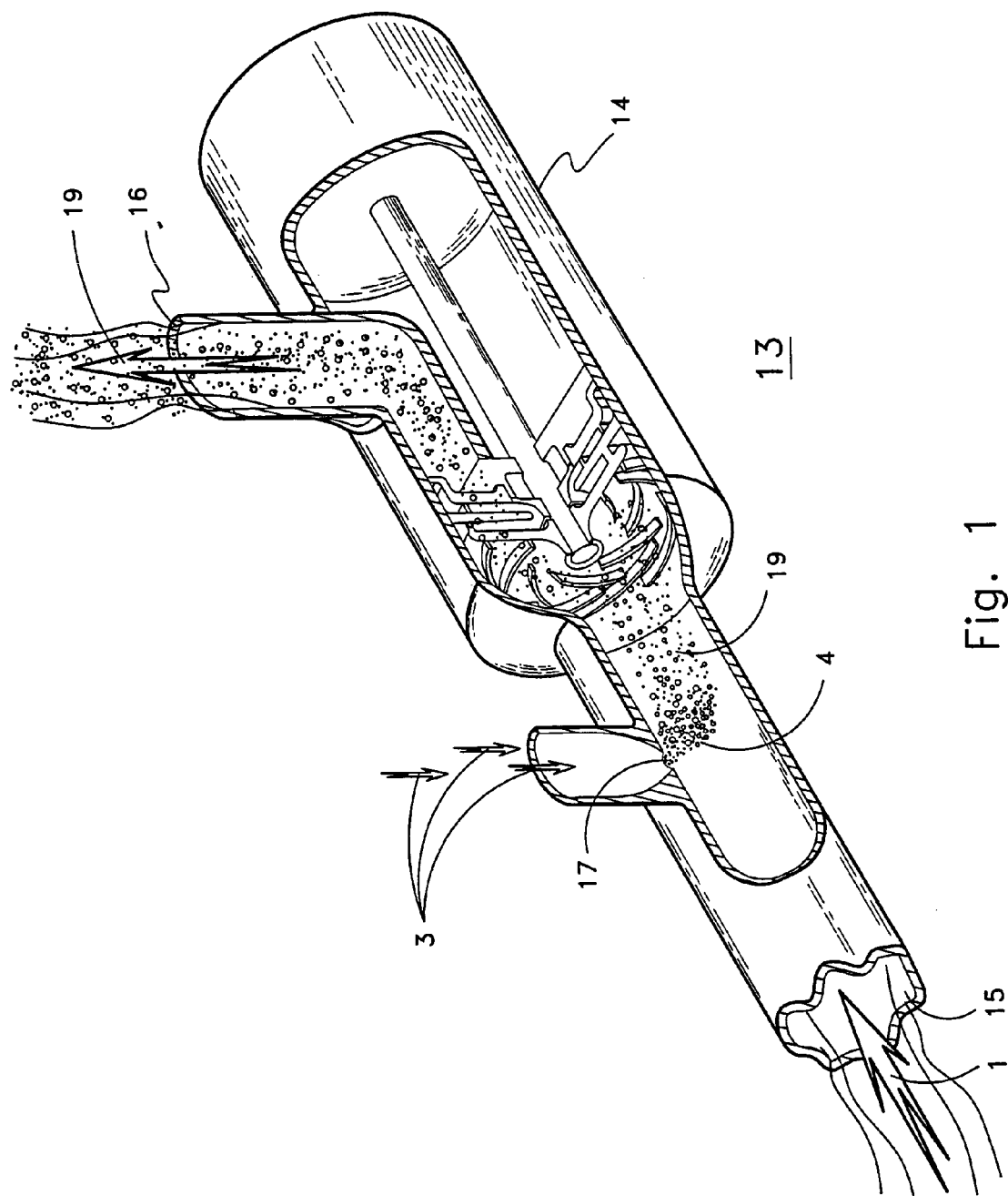

Generally, the invention involves a juice process system to purify juice without addition of base or with reduced addition of base prior to evaporation of excess water content or fractional crystallization of sucrose. Specifically, the invention provides juice having reduced dissolved material, reduced dissolved gases, higher pH, or lower acidity for use in juice process systems.

As discussed above juice can be obtained from plant material such as sugar beets, sugar cane, sweet sorghum, or the like. Naturally, there may be large commercial markets or niche markets for products that necessitate obtaining juice from other types of plant material and it should be understood that the invention is not limited to juice removed, extracted, or obtained from any particular type of plant, or any portion of the plant or plant material harvested. Moreover, the term juice can be broadly understood to be any sucrose containing juice or liquid at, or from, any step in any process system prior to sugar crystallization. As such, sucrose containing liquids obtained from plant material by milling or pressing steps, or the juice resulting from the steps of diffusing the plant material, as but two examples, are juice. As further described above, the term juice includes liquid containing sucrose, non-sucrose substances, and water that can occur in various proportions depending on the nature of the plant material and the steps used to remove juice from the plant material. It may be desirable to remove all or a portion of the dissolved materials because they are highly colorized, thermally unstable, or otherwise interfere with certain processing steps or adversely impact the quality or quantity of the sugar product resulting from the purification process. The sucrose containing liquids resulting from these various clarification or purification steps are also included in the term juice.

Particular embodiments of the invention involve the removal of at least a portion of the dissolved materials, volatile materials, dissolved gases, aqueous acids, or the like, such as carbon dioxide or sulfur dioxide that can form aqueous acids that generate hydronium ion in solution, change the concentration of hydronium ion in the juice, or lower the pH of the juice.

For example, when juice contains sufficient cations, hydroxide ion OH— can act as a anion, which enables carbon dioxide $CO_2$ to dissolve into the juice as carbonate ions $(CO_3)^{-2}$, or as bicarbonate ions $HCO_3^-$. The dissociation of $HCO_3^-$ provides a very weak acid. However, when juice contains an insufficient number of cations to allow dissolved $CO_2$ to form carbonate or bicarbonate ions, an equilibrium results between carbon dioxide and carbonic acid $H_2CO_3$. Carbonic acid can act as a strong acid in the pH range that juice is obtained. The consequent production of hydronium ion increases the existing concentration in the juice resulting in values of pH that can be lower.

Similarly, sulfur dioxide ($SO_2$) or ammonium bisulfite ($NH_4HSO_3$) can be introduced into the juice to control, reduce, or eliminate microbiologic activity, sucrose hydrolysis, formation of invert sugars, or loss of sucrose, or to adjust pH lower. Again, when juice contains sufficient cations, such as calcium, sulphites, such as calcium sulfite can result. However, when juice contains an insufficient number of cations to allow dissolved sulfur dioxide ($SO_2$) to form sulphites, an equilibrium results between sulfur dioxide (SO2), sulfurous acid ($H_2SO_3$), and sulfuric acid ($H_2SO_4$). Sulfuric acid and sulfurous acid can act as strong acids. The consequent production of hydronium ion increases the existing concentration in the juice resulting in values of pH that can be lower.

Additionally, other aqueous acids can be generated by the plant during normal growth and other acids are generated by microbial activity including, but not limited to, phosphoric acid, hydrochloric acid, sulfuric acid, citric acid, oxalic acid, succinic acid, fumaric acid, lactic acid, glycolic acid, pyrrolidone-carboxylic acid, formic acid, acetic acid, butyric acid, maleic acid, lactic acid, or the like.

Moreover, other dissolved materials, such as ammonia $NH_3$, can be generated by the breakdown of amino acids or by the conversion of materials added to the juice such as ammonium bisulfite.

Now referring primarily to FIG. 1, an embodiment of the invention can comprise exposing juice (1) obtained from plant material (2) to a mixture of gases (3) in a manner that generates an increased interface surface area (4) between the juice (1) and the mixture of gases (3). By generation of the increased interface surface area (4) between the juice (1) and the mixture of gases (3), the transfer rate of various types of dissolved materials (5) from the juice (1) to the mixture of gases (3) can be increased as the concentration of each component of the dissolved material (5) moves toward equilibrium with the concentration of that component in the mixture of gases (3). The mixture of gases (or stripping gas) can be selected to provide the desired partial pressures necessary to allow transfer of the undesired dissolved material (5) from the juice (1) to the mixture of gases (3). The mixture of gases (3) can be refreshed, or the partial pressures of the gases adjusted, continuously or periodically, at the increased interface surface area (4) with the juice (1) to prevent equilibrium between the mixture of gases (3) and the dissolved material (5) from occurring, thereby maintaining transfer of dissolved material (5) from the juice to the mixture of gases (3).

When the invention is utilized dissolved materials or volatile materials, such as, volatile inorganic compounds, volatile organic compounds, or dissolved gases (e.g. carbon dioxide, sulfur dioxide, or ammonia) can be removed from the juice. The juice product resulting from use of the invention can have reduced dissolved material, reduced dissolved gases, reduced capacity to generate hydronium ion, or a decreased concentration of hydronium ion, lower acidity, or a higher pH as compared to the same juice without application of the invention. As but one example, the concentration of carbon dioxide in the juice can be reduced substantially when atmospheric partial pressures are used to strip the juice. The pH of the juice product resulting from the process can have a pH value that is higher by 0.05 pH, 0.1 pH, 0.2 pH, 0.3 pH, 0.4 pH, 0.5 pH, 0.6 pH, 0.7 pH, 0.8 pH, 0.9 pH, 1.0 pH, 1.1 pH, 1.2, pH1.3, pH1.4, pH1.5, pH1.6, pH1.7, pH1.8, pH1.9, 2.0 pH, however, any upward adjustment of the pH value from the initial pH value of the untreated juice can result in a substantial monetary savings and can be important commercially. The actual amount of upward adjustment of the pH value from the initial pH value generally depends upon the kind and quality of juice treated by the invention, the extent of the increased interface surface area generated throughout the volume of juice, the duration of time the mixture of gases is responsive to the increased interface surface area generated, and the partial pressures provided in the mixture of gases. As such, the upward adjustment of the pH value can vary with respect to the embodiment of the invention utilized. For example, varying the volume or amount of juice treated per unit time, but otherwise using the same embodiment of the invention, can yield a different increment in change of the pH value.

The invention can further comprise the step of reducing the amount of base added per unit weight or unit volume of the juice treated with the invention to achieve a necessary or desired pH, concentration of hydronium ion, or acidity as compared to untreated juice or conventional process treated juice. The amount of base added after reducing dissolved material in the juice by treatment with the invention can be substantially less to establish a desired pH value, such as, between about 11.0 to about 12.0, or between 11.5 to about 12.5, or the range of pH used to "prelime", "main lime", "intermediate lime, or to establish a pH value corresponding to the iso-electric point of any particular non-sucrose substance in the juice, or required to adjust the acidity or alkalinity of the juice to a desired concentration. With respect to lime usage, for example, a reduction of up to about 30% can be achieved by using the various embodiments of the invention as compared to untreated juices or conventional process treated juices.

Figure 2:
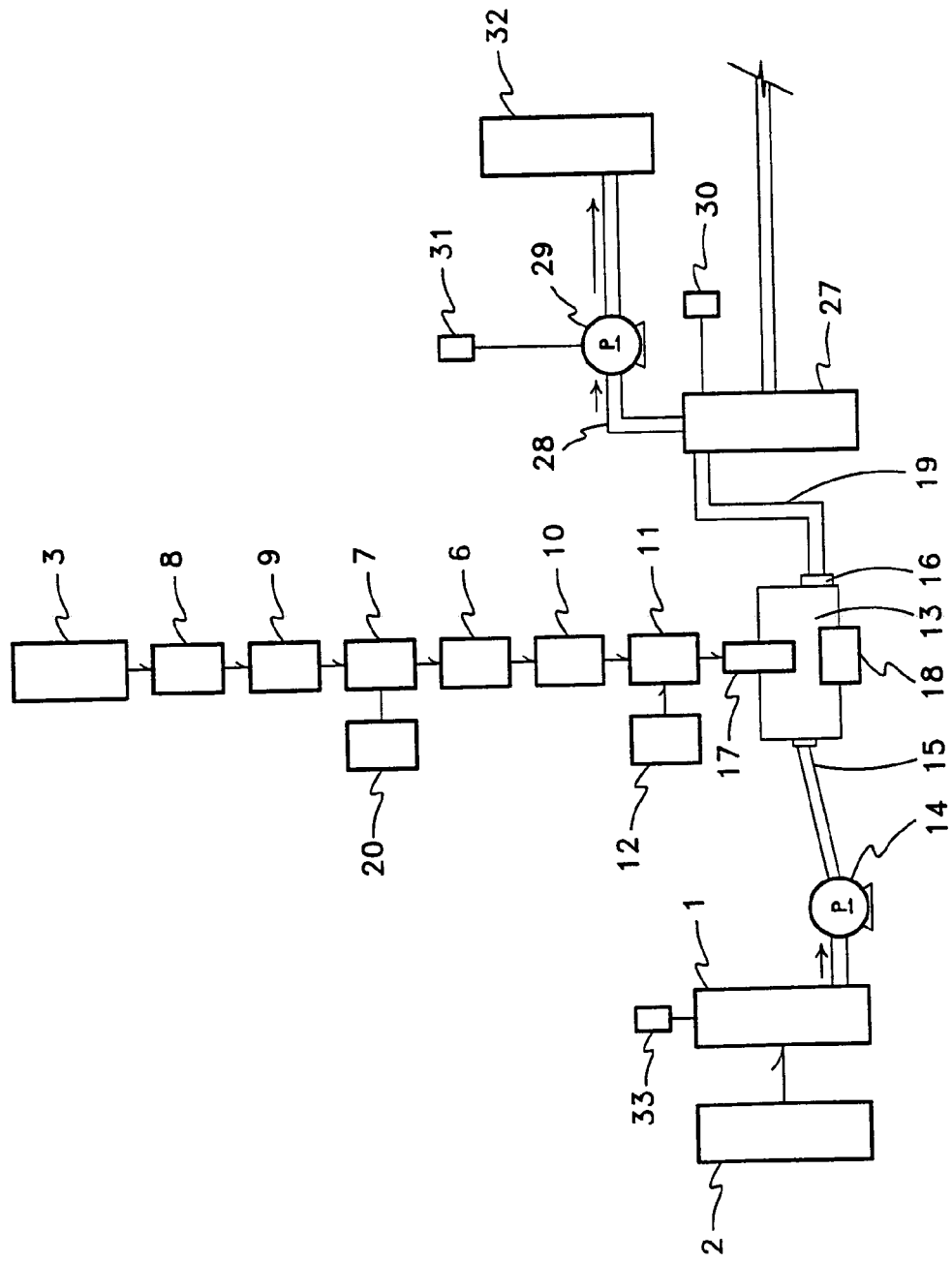
FIG. 2 shows a particular embodiment of the invention to produce a juice product having a reduced amount of dissolved material.

Now referring primarily to FIG. 2, embodiments of the invention can comprise a mixture of gases (3) that can comprise atmospheric gases, or air; atmospheric gases or air that have been passed through one or more filters to reduce, or to substantially eliminate, non-biological particulate or biological particles (such as bacteria, viruses, pollen, microscopic flora or fauna, or other pathogens); atmospheric gases or air that have been passed through chemical scrubbers or otherwise processed to generate a desired concentration or range of concentrations of partial pressures of gases; purified gases; or combinations or permutations thereof.

Particular embodiments of the invention can further include a gas filter (6) responsive to the flow of the mixture of gases (3). The gas filter (6) can be located before, or can be located after, a gas flow generator (7) made fluidicly responsive to the mixture of gases (3). The gas filter (6) responsive to the flow of the mixture of gases (3) can comprise a Hepa filter, or a Ulpa filter, or other type of macro-particulate or micro-particulate filter. Additional prefilters may also be used to capture particles in the mixture of gases prior to entering the gas flow generator (7), or may be used after the gas flow generator but prior to the gas filter (6).

An unfiltered mixture of gases (3) can be drawn into a first stage prefilter (8) then through the second stage prefilter (9) and then through the gas flow generator (7). The prefiltered mixture of gases can then flow through the gas filter (6) (Hepa filter, or Ulpa filter, or other type filter). The resulting filtered mixture of gases (up to 99.99% of all particles as small as about 0.3 microns removed from the mixture of gases (3) when a Hepa filter is used, and up to 99.99% of all particles as small as about 0.12 microns removed from the mixture of gases (3) when a Ulpa filter is used) can then be made to generate or be responsive to the increased interface surface area (4) between the juice (1) and the mixture of gases (3). As to other embodiments of the invention, the mixture of gases (3) or the juice (1) can be exposed to short wavelength ultraviolet radiation source (10) in order to reduce the number of pathogen particles or bacterial particles. The invention can further comprise temperature control means (11) for establishing a desired temperature of the mixture of gases (3) prior to making them responsive with the juice (1) or the increased interface surface area (4). The temperature control means (11) can be made responsive to a temperature sensor (12) that can detect the temperature of the mixture of gases (3) or the juice (1) and can signal or cause the temperature control means (11) to adjust the temperature of the mixture of gases (3) or the juice (1), or both, to a desired temperature.

With respect to certain embodiments of the invention, the mixture of gases (3), whether filter or unfiltered, can be used to form or assist in the formation of the increased interface surface area (4). For example, juice (1) can be transferred to a gas injector (13) by gravity feed or transferred under pressure generated by a pump (14) or other liquid transfer element. The gas injector (13) can have an inlet port (15) through which juice (1) enters the gas injector (13), an outlet port (16) from which juice (1) exits the gas injector (13), and at least one injection port (17) through which the mixture of gases (3) can be delivered into at least a portion of the volume of juice (1) contained within or passed through the gas injector (13).

When the gas injector (13) has a configuration for batch processing of juice (the gas injector is periodically filled and emptied) the inlet port (15) and the outlet port (16) can, with respect to certain embodiments of the invention, be the same port. When the gas injector (13) has a configuration for pulsatile flow processing (the flow of the juice (1) can be periodically diminished or interrupted to increase residence time of the juice (1) in or responsive to the gas injector (13)), or continuous flow processing (a stream of juice (1) flows continuously through the gas injector (13) although the rate or volume of juice (1) flowing through the gas injector (13) may be adjusted) the inlet port (15) and the outlet port (16) can be discrete.

As to each embodiment of the invention, the mixture of gases (3) can be injected into the juice (1) with a sufficient volume, at a sufficient pressure, or with a pattern of distribution (e.g. diffused or as small bubbles) to generate the desired increased interface surface area (4) between the juice (1) and the mixture of gases (3). The increased interface surface area (4) can provide the interface at which at least a portion of the dissolved material (5) in the juice can transfer from the juice (1) to the mixture of gases (3).

The gas injector (13) whether configured to operate as a batch, pulsatile, intermittent, or continuous embodiment of the invention, can further agitate, move, stir or otherwise provide mixing means (18) to further distribute the mixture of gases (3) into the juice (1) to further generate the increased interface surface area (4). Where the configuration of the gas injector (13) generates a stream of juice (1), whether continuous, pulsatile, or discontinuous, injecting the mixture of gases (3) into the juice (1) can generate a mixed stream of juice (19). The mixture of gases in the mixed stream of juice (19) may be further distributed in the mixed stream of juice (19) by further extensions, channels, or the like coupled to the interior surface of the gas injector (13). The extensions or channels can be oriented to create a desired perturbation of the stream of juice within the gas injector (13). The invention can further provide a injection pressure adjustment means (20) to which the gas flow generator (7) can be responsive to increase or decrease the pressure or volume of the mixture of gases (3) injected, mixed, or sparged into the juice (1). In some embodiments of the invention, the injection pressure adjustment means (20) can individually or in combination comprise a variably adjustable restriction means located between the gas flow generator (7) and the injection port (17).

The invention, with respect to certain embodiments, can generate total dissolved gases within the juice greater than the initial concentration in the juice. This can be up to about 10 times the concentration that would be obtained by saturating the juice at atmospheric pressure. The pressure of the mixture of gases (3) injected into the juice (1) can be between the initial pressure exerted by the juice (1) to about a pressure of about 20 bars.

Multiple gas injectors (13) can be used in series or in parallel, and each gas injector can have multiple gas injection ports (17) at substantially the same location or different locations in a series or in parallel. Each injection port (17) may be separately or variably controlled with respect to the volume and pressure of the mixture of gases (3) injected in the juice (1). The variably adjustable injection ports (17) can be made responsive to the volume of juice (1), the residence time of the juice in the gas injector (13), the concentration or amount of dissolved materials (5) in the juice (1), or the concentration of dissolved gases in the juice (1), or the like.

With respect to other embodiments of the invention, the mixture of gases (3) can be injected into the juice (1) prior to the pump (14), whereby the pump (14) can act to distribute the mixture of gases (3) with the stream of juice (1) to generate the mixed stream (19) and increased interface surface area (4). As to certain types of pumps, the mixed stream (19) can comprise at least 35% mixture of gases with substantially 100% saturation of the stream of juice (1) with bubbles of the mixture of gases (3). As but one example, a Shanley Pump, can be used to generate the mixed stream (19). Shanley Pump, hereby incorporated by reference herein. A plurality of pumps (14) can be run in series or parallel as required to process a certain volume of juice (1) within the desired duration of time.

With respect to other embodiments of the invention, a stream of juice (1) can be further configured to provide a venturi effect, or otherwise develop a reduced pressure responsive to the stream of juice (1) to draw the mixture of gases (3) into the stream of juice (1), whether pulstile, continuous, or intermittent.

With respect to certain embodiments of the invention, only a portion of the stream of juice (1) may be exposed to the mixture of gases (3). For example, if the juice (1) contains a low amount of dissolved material (5), then the stream of juice (1) can be split and only a portion of the juice (1) exposed to the mixture of gases (3). The streams of juice (1) can then later be recombined in the proportions desired.

Figure 3:
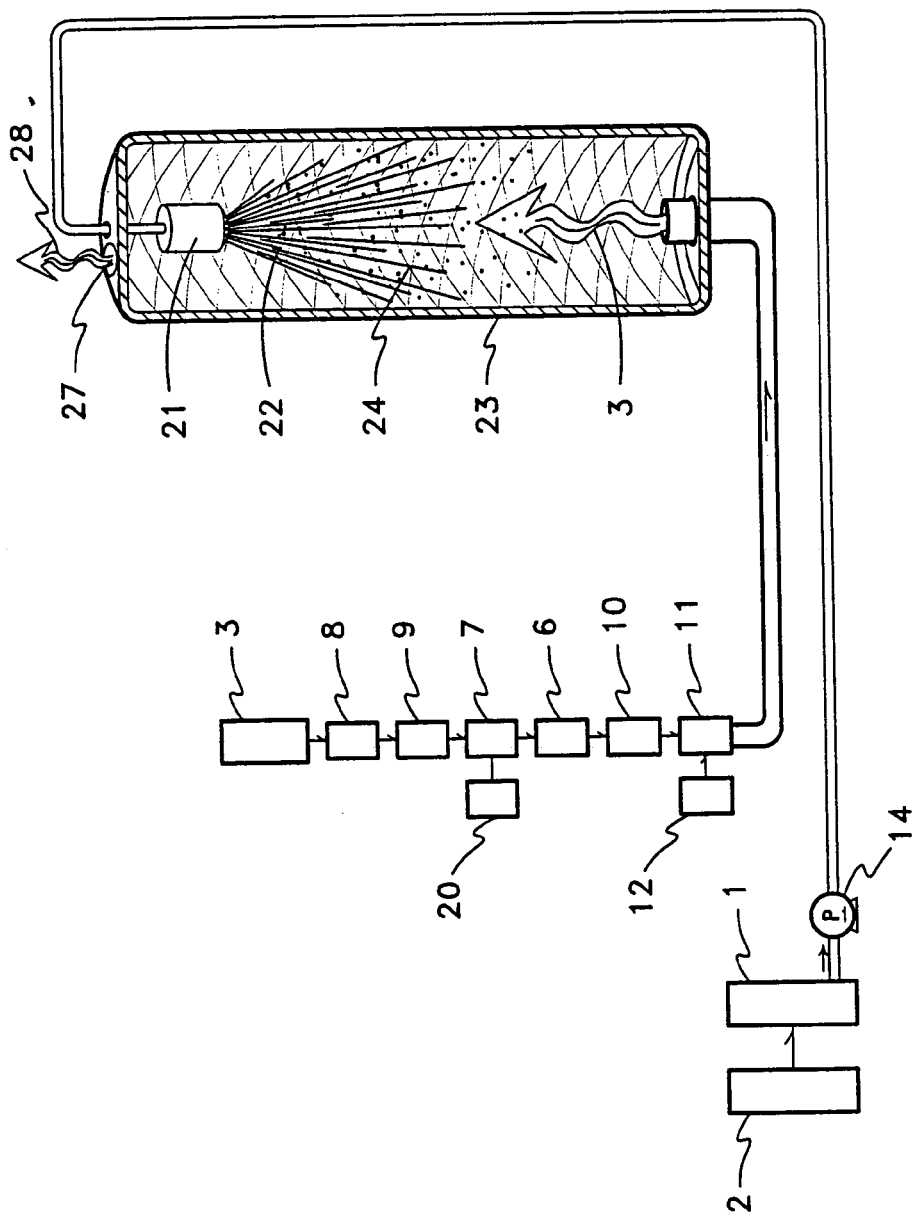
FIG. 3 shows second particular embodiment of the invention to produce a juice product having a reduced amount of dissolved material

Now referring primarily to FIG. 3, with respect to other embodiments of the invention, juice (1) can be sprayed through a juice distribution element (21), such as a nozzle. The juice distribution element (21) can create a spray of very fine juice droplets (22) or particles. As such, spraying generates an increased interface surface area (4). The juice can be sprayed in an aeration containment element (23) and the mixture of gases (3), whether or not filtered or scrubbed as described above, can be exposed to the sprayed juice droplets. Juice can be discharged into the top region of the aeration containment element (23) (e.g. via a spray nozzle) and then exposed to the mixture of gases (3) passed through the aeration containment element (23). The mixture of gases (3) can be passed through the aeration containment element (23) counter current to the direction of the of the juice droplets (22) to increase the efficiency of transfer of dissolved material (5) in the juice (1) to the mixture of gases (3). The aeration containment element (23) can be, for example, a 150 gallon tank but it can be appreciated that the size and shape of this tank can vary depending upon the quantity of the juice that is being processed.

In certain embodiments of the invention the aeration containment element (23) can further contain a juice distribution surface (24). Juice (1) can be distributed to the juice distribution surface (24) to provide a further increased interface surface area (4). Again, juice can be discharged into the top region of the aeration containment element (23) spread over the juice distribution surface (24) and can be exposed to the mixture of gases (3) passed through the aeration containment element (23). Again, the mixture of gases (3) can be passed through the aeration containment element (23) counter current to the general direction that the juice (1) flows on the juice distribution surface (24) to increase the efficiency of transfer of dissolved material (5) in the juice (1) to the mixture of gases (3).

As to each of these embodiments of the invention utilizing the aeration containment element (23), the juice (1) can be collected and cycled through the aeration containment element (23) as many times as may be desired.

Figure 4:
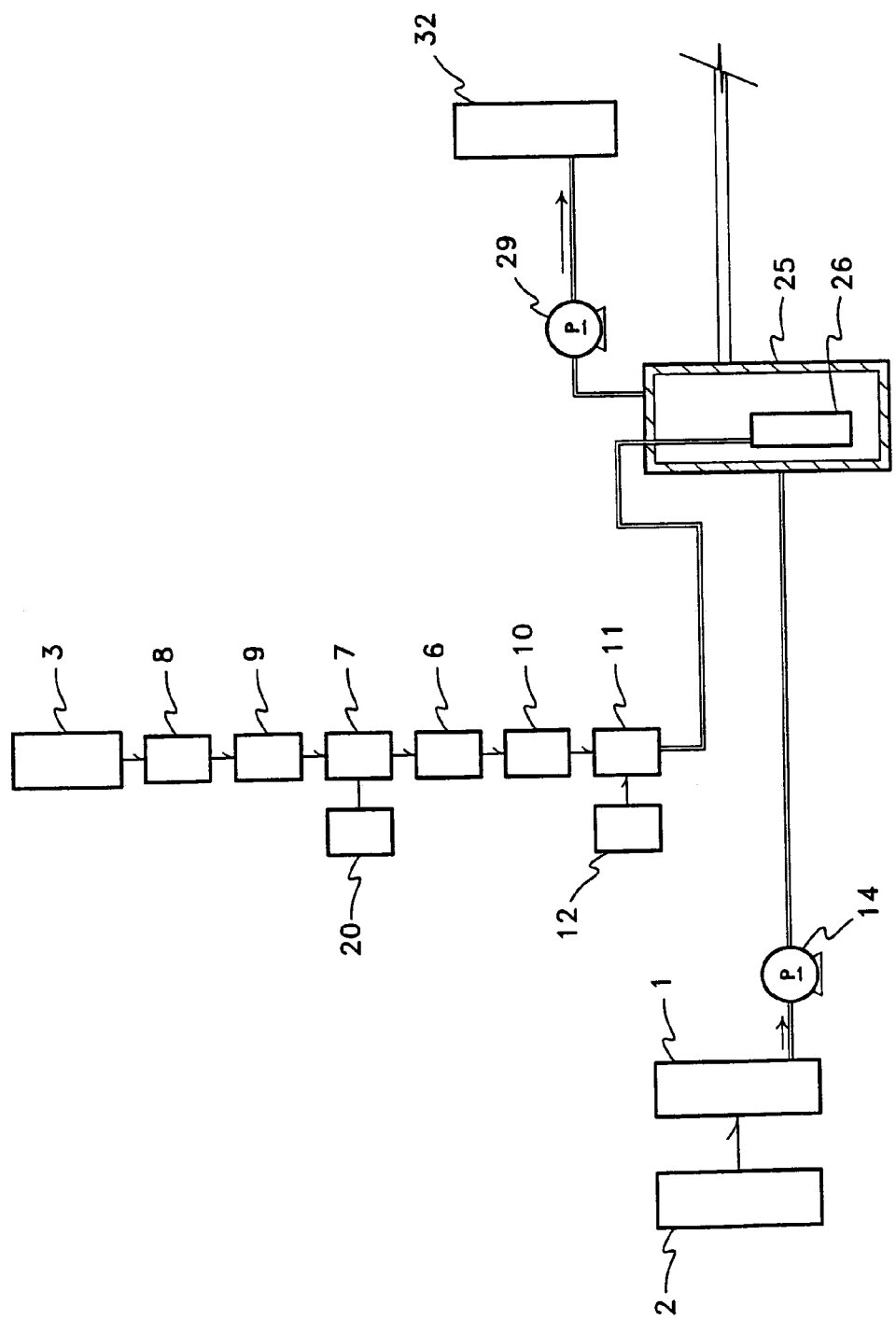
FIG. 4 shows third particular embodiment of the invention to produce a juice product having a reduced amount of dissolved material.

Now referring primarily to FIG. 4, in other embodiments of the invention, juice (1) can be transferred to a juice containment element (25), and the mixture of gases (3) can be introduced into the juice (1) by sparging the juice (26). The pressure and volume of the mixture of gases (3) can be adjusted relative to the volume of juice (1) and the size of the juice containment element (25). The juice containment element can further be combined with the aeration containment element (23) described above.

A general discussion of gas absorption provided by Chemical Engineer's Handbook, Perry, ed., McGraw-Hill Book Company, pg. 668 et seq. (1950) is hereby incorporated by reference to the extent necessary for an understanding of the general principals of gas absorption.

It can be appreciated that a variety of conventional conduits, valves, or other devices, for example, pressure gauges, can be provided to generate relevant information concerning the transfer of the juice (1) to the gas injector (13), aeration containment element (23), or juice containment element (25), the amount and pressure of the mixture of gases (3) injected, sprayed, or sparged, the amount of dissolved material (5) in the juice (1), or the like.

Again referring primarily to FIG. 2, the invention can further include a gas separator (27) to release the mixture of gases (3) which contain dissolved material (5) transferred from the juice (1). In certain embodiments of the invention, where an aeration containment element (23) is utilized, as described above, the gas separator (27) can comprise an aperture in the aeration containment element allowing the mixture of gases passed through the aeration containment element to be discharged to atmosphere. In those embodiments of the invention where the gas injector (13) comprises a sparger (26), the gas separator (27) can be an aperture allowing the mixture of gases (3) containing dissolved material to be discharged to atmosphere. In those embodiments of the invention where the gas injector (13) introduces the mixture of gases (3) into a stream of juice (1) to generate a mixed stream of juice (19), whether continuous, pulsatile, or intermittent, transferred in a conduit closed from atmosphere, the gas separator (27) can comprise a portion of the conduit that further provides an interior volume fluidicly coupled to atmosphere. Specifically, the gas separator (27) fluidicly coupled to atmosphere can comprise a portion of the conduit configured to, or having restriction means to, adjust the time that the mixed stream (19) is responsive to atmosphere.

Specifically, one configuration of the gas separator (27) can be an increase in the internal volume of the conduit to spread the mixed stream (19) over the interior surface of the conduit to increase the residence time that, or to increase the surface area when, the juice is fluidicly coupled to atmosphere, or both. In certain embodiments of the gas separator (27), the juice can be spread over a surface area sufficiently large to allow the mixture of gases (3) within the juice (1) to substantially equilibrate with atmospheric partial pressures prior to transfer of the juice from the gas separator (27). The interior surfaces of the gas separator (27) can be further configured to provide extensions, corrugates, grooves, or the like, to further mix or agitate the juice (1) within the gas separator (27) to increase the rate at which the mixture of gases (3) can be transferred from the juice (1) to atmosphere.

A gas flow of the mixture of gases (28) transferred from the juice (1) to atmosphere can be generated by coupling a source of reduced pressure (29) to the gas separator (27). Reduced pressure involves generating partial pressures of gases at the increased surface area (4) of the juice (1) that are lower than the partial pressures of the dissolved materials (5) transferred to the mixture of gases (3). As can be understood, the source of reduced pressure (29) can be atmosphere when the partial pressures of the mixture of gases containing dissolved materials (5) removed from the juice exceeds atmospheric pressure. With respect to some embodiments of the invention, as described above, a source of reduced pressure (29) can be generated by increasing the interior volume of the conduit in which the mixed stream (19) flows. The source of reduced pressure (29) can also be generated by a vacuum pump, a venturi, or other device fluidicly coupled to the gas separator (27). The partial pressure of gases generated at the increased surface area (4) of the juice can then be adjusted as desired (e.g. below atmospheric pressure) to increase the transfer rate of the mixture of gases (3) containing dissolved material (5) from the mixed stream (19) of juice.

As to some embodiments, the gas separator can further include a relief valve (30) or further include a signal generator (31), coupled to the source of reduced pressure (29) that can be responsive to accumulation of, or partial pressures of, gases within the gas separator (27), or responsive to a reduction in dissolved materials in the juice (total dissolved material, certain dissolved materials, concentration of dissolved materials, or concentration of certain dissolved materials), a reduction in acidity of the juice, alkalinity of the juice, an increase in pH of the juice, or other measure, that indicates sufficient dissolved material has been transferred from the juice (1).

The invention can further include storage or conveyance of the mixture of gases (32) containing dissolved materials removed from the juice that avoids discharging all or a portion to atmosphere. In certain embodiments of the invention the mixture of gases containing dissolved materials from the juice (e.g. containing carbon dioxide) can be utilized for carbonation steps as described above, as but one example.

The invention can also include the addition of antifoaming agents (33) to the juice (1). Juice contains a large amount of material that can be surface active or that can alter the surface tension of water. As such, air inclusion within the juice, or dissolved gases transferred from the juice to atmosphere, can result in foam. There are many kinds of antifoaming agents that can be used to reduce the amount of foam. Including, but not limited to, fatty acids, oils, or the like. To accomplish injection of the mixture of gases (3) into juice (1) or to transfer the mixture of gases (3) containing at least some dissolved material (5), as described above, can further require the step of adding an amount of antifoaming agent simultaneous with, or at about the time the juice is exposed to or injected with, the desired mixture of gases (3).

Once the desired amount of dissolved material, volatile material, dissolved gases, aqueous acids, or the like, have been transferred from the juice (1) the resulting juice product can be transported to existing sugar process facilities for further clarification or purification. Alternately, the various embodiments of the invention can be incorporated into sugar process facilities to produce juice having reduced dissolved material in situ.

Figure 5:
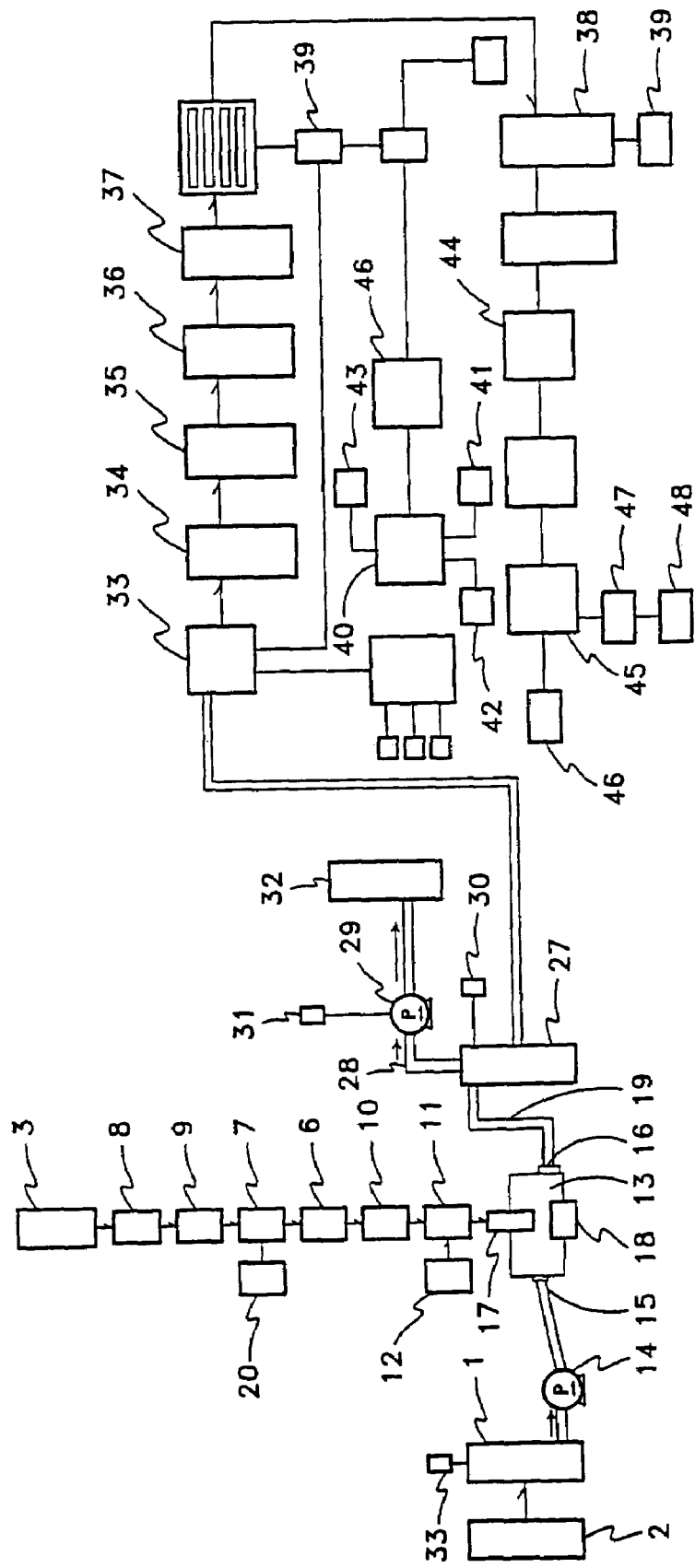
FIG. 5 shows a particular embodiment of the invention to produce juice having a reduced amount of dissolved material that further includes a the use of liming and carbonation to further clarify or purify the juice prior to reduction of water content to produce syrup, or prior to crystallization of sugar.

Now referring to FIG. 5, with respect to sugar process systems which utilize base, such as calcium oxide or calcium hydroxide, to raise pH for the purpose of initially reaching the iso-electric point of the various materials dissolved in the juice (1), or as part of conventional method of preliming juice (33) either separate from or in conjunction with further steps such as cold liming (34), main liming (35) or intermediate liming (36) again separate from or in conjunction with a first carbonation step (37) or second carbonation step (38) that can result in a precipitate of calcium carbonate (39) to trap at least a portion of the non-sucrose substances from the juice (1) so that the resulting clarified or purified juice can be filtered (44) prior to evaporation (45) of the desired amount of water, the method and apparatus involving the invention can be utilized to produce a juice product having reduced dissolved material or reduced dissolved gases consistent for introduction into one, or more, or all of these conventional steps, or conventional steps modified to the extent to benefit from the characteristics of the juice treated in accordance with the invention.

As can be appreciated the invention can be used to reduce dissolved materials within the juice prior to any addition of base. Because the invention can substantially increase the pH or reduce the acidity of the juice, the amount of base used in conventional preliming or main liming steps can be reduced. Alternately, in those process systems in which the underflow in the process system, such as spent lime, is used to neutralize some portion of the acid in the juice, or used to reduce foaming, the under flow can be introduced either before or after utilizing the invention Specifically, a method of purifying juice utilizing the invention can comprise obtaining juice (1) from plant material (2) where the juice as above described contains sucrose, non-sucrose substances, and water. Utilizing the invention in the various embodiments shown or described to either raise the pH or lower acidity of the juice prior to preliming (33) the juice. Cold main liming (34) the juice (1) or hot main liming (35), or both, can be utilized in conjunction with carbonating (37)(38). Where calcium oxide or calcium hydroxide has been employed as the base (46) in the preliming (33) or main liming (34)(35) steps, a carbonation step (37) precipitating calcium carbonate (39) can result in trapping at least a portion of the non-sucrose substances in the juice (1). These precipitates (39) allow removal of the trapped non-sucrose substances by separation of the juice (1) from the precipitates (39). In some embodiments of the invention, an intermediate liming (36) step in conjunction with an additional carbonation (38) step can be performed. Again precipitating calcium carbonate (39) can allow removal of trapped non-sucrose substances. Removing calcium carbonate precipitates (39) can yield a juice (1) that after by removing water content (45) to the desired amount can yield desired syrups (46). Alternately, crystallizing (47) the sucrose content within the juice can yield sugar products (48).

Figure 6:
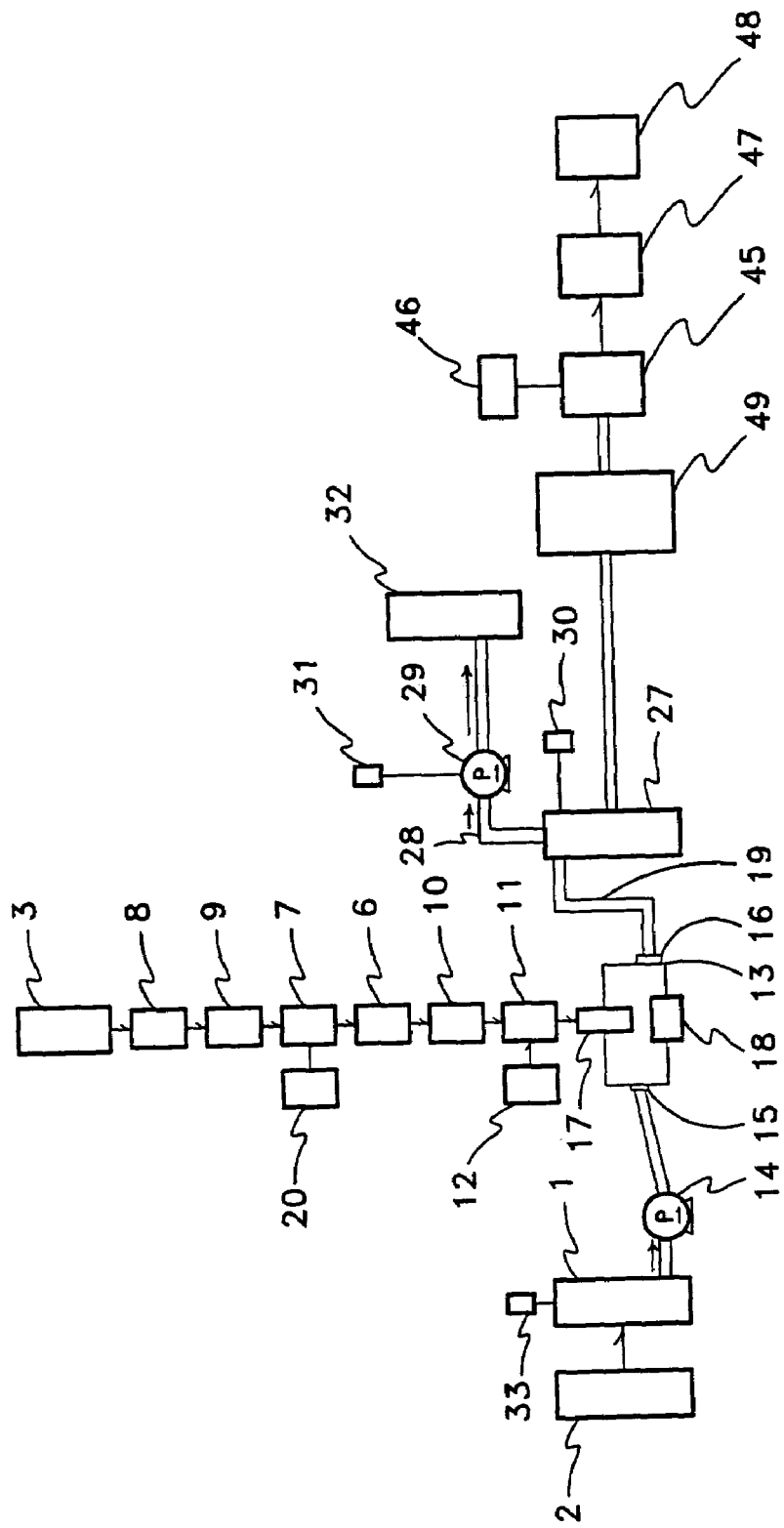
FIG. 6 shows a particular embodiment of the invention to produce juice having a reduced amount of dissolved material that further includes a the use ion exchange to further clarify or purify the juice prior to reduction of water content to produce syrup, or prior to crystallization of sugar.

Now referring primarily to FIG. 6, with respect to sugar process systems that utilize ion exchange (49) to replace conventional calcium carbonate purification steps in the sugar process system as described above, it can be understood from U.S. Pat. Nos. 3,785,863; 4,331,483; or 4,140,541, each hereby incorporated by reference, that base, such as lime can be used to pretreat juice so that it may more readily be filtered prior to ion exchange steps (49), to regenerate ion exchange material to generate the calcium form so that the polar load of the juice is exchanged for calcium, or to reduce acidity of the juice after ion exchange processes.

In these types of processes, the invention can be used to reduce the amount of dissolved materials, or dissolved gases, or reduce acidity of the juice prior to or in conjunction with pretreatment of the juice, or to reduce the polar load of the juice prior to ion exchange, or to reduce the acidity of the juice after the ion exchange steps. Each of these can be accomplished by processing the juice in accordance with the invention.

Figure 7:
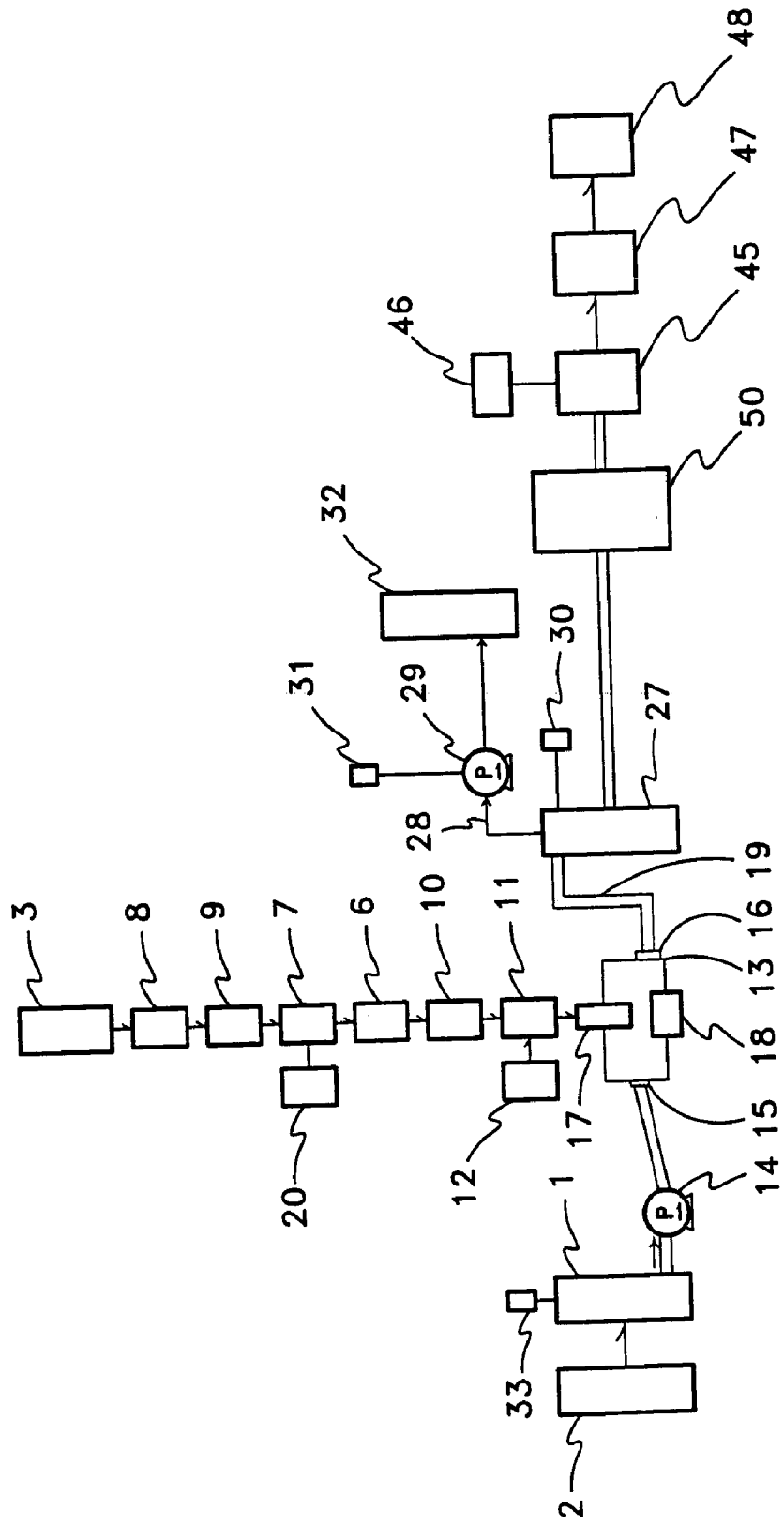
FIG. 7 shows a particular embodiment of the invention to produce juice having a reduced amount of dissolved material that further includes filtration steps such as ultrafiration to further clarify or purify the juice prior to reduction of water content to produce syrup, or prior to crystallization of sugar.

Now referring primarily to FIG. 7, with respect to sugar process systems that utilize filtration or ultrafiltration to replace conventional calcium carbonate purification steps in the sugar process system as described above, it can be understood from U.S. Pat. No. 4,432,806, hereby incorporated by reference, that base, such as lime can be used to pretreat juice so that it may more readily be filtered (50).

In these types of processes, the invention can be used to reduce the amount of dissolved materials, or dissolved gases, or reduce acidity of the juice prior to or in conjunction with pretreatment of the juice with base to allow non-sucrose substances to reach their isoelectric points and aggregate, or to otherwise generate solid particulates that can be filtered from the remaining liquid portion of the juice.

Each of these can be accomplished by processing the juice in accordance with the invention.

EXAMPLE 1

Juice was obtained by conventional tower diffusion of sugar beet cossettes. A control group and an experimental group each consisting of six substantially identical 500 mL aliquots of the diffusion juice were generated. Each aliquot within the control group and the experimental group was analyzed to ascertain the pH value. As to each aliquot of the diffusion juice in the control group the pH value was about 6.3. Each aliquot within the control group without any further treatment was titrated to an 11.2 pH endpoint with a solution of 50% wt./vol. caustic soda. Each aliquot within the experimental group was treated in accordance with the invention after which the pH of each aliquot was ascertained and each experimental aliquot titrated in substantially identical fashion to the control group to an 11.2 pH endpoint with a solution of 50% wt./vol. caustic soda.

The results are set out in Table 1 below. As can be understood from the table each aliquot of juice prior to any treatment had a pH of about 6.3. The experimental group after treatment in accordance with the invention had increased pH values without the addition of any base, and required a reduced amount of caustic soda to achieve the 11.2 pH endpoint as compared to the control group.

TABLE 1

| | Untreated Juice pH | mL Caustic Soda | Treated Juice pH | mL Caustic Soda | % reduction Caustic Soda |
|---|---|---|---|---|---|
| 1 | 6.3 | 1.8 | 6.5 | 1.5 | 16.6 |
| 2 | 6.3 | 1.8 | 6.6 | 1.4 | 22.2 |
| 3 | 6.3 | 1.8 | 6.6 | 1.4 | 22.2 |
| 4 | 6.3 | 1.9 | 6.6 | 1.6 | 15.8 |
| 5 | 6.3 | 1.9 | 6.5 | 1.5 | 21.0 |
| 6 | 6.3 | 1.9 | 6.5 | 1.6 | 15.8 |

The reduction in the amount of caustic soda to reach the 11.2 pH endpoint for the aliquots of juice in the experimental group treated in accordance with the invention as compared to the aliquots of juice in the untreated control group was between about 15.8% and about 22.2%.

EXAMPLE 2

Juice was obtained by conventional tower diffusion of sugar beet cossettes. A control group and an experimental group each consisting of five substantially identical 500 mL aliquots of the diffusion juice were generated. Each aliquot within the control group and the experimental group was analyzed to ascertain the pH value. As to each aliquot of the diffusion juice in the control group the pH value was about 6.1. Each aliquot within the control group without any further treatment was titrated to an 11.2 pH endpoint with a solution of 30 brixs milk of lime. Each aliquot within the experimental group was treated in accordance with the invention after which the pH of each aliquot was ascertained and each experimental aliquot titrated in substantially identical fashion to the control group to an 11.2 pH endpoint with a solution of 30 brixs milk of lime.

The results are set out in Table 2 below. As can be understood from the table each aliquot of juice prior to any treatment had a pH of about 6.1. The experimental group after treatment in accordance with the invention had increased pH values without the addition of any base, and required a reduced amount of milk of lime to achieve the 11.2 pH endpoint as compared to the control group.

TABLE 2

| | Untreated Juice pH | mL Milk of Lime | Treated Juice pH | mL Milk of Lime | % reduction Milk of Lime |
|---|---|---|---|---|---|
| 1 | 6.1 | 4.6 | 6.5 | 3.3 | 28.3 |
| 2 | 6.1 | 4.4 | 6.6 | 3.2 | 27.3 |
| 3 | 6.1 | 4.7 | 6.6 | 3.5 | 25.5 |
| 4 | 6.1 | 4.4 | 6.6 | 3.3 | 25.0 |
| 5 | 6.1 | 4.5 | 6.6 | 3.3 | 26.7 |

The reduction in the amount of milk of lime to reach the 11.2 pH endpoint for the aliquots of juice in the experimental group treated in accordance with the invention as compared to the aliquots of juice in the untreated control group was between about 25.0% and about 28.3%.

Also, the data set out in Table 1 and Table 2 provides a comparison of two different types of diffusion apparatus and diffusion methods. Importantly, the data shows that different diffusers or different diffusion methods can generate diffusion juice having significantly different pH values even though pH values attributed to each type of diffusion technology can be substantially internally consistent. See for example the initial pH value of the untreated diffusion juice in Table 1 which shows a pH value of 6.3 as compared to the untreated diffusion juice in Table 2 which a pH value of 6.1.

While there may be different types of diffusion apparatus and different diffusion methods, there is a lack of recognition within the ordinary skill in the art that pH can be altered or reduced during diffusion of sugar beet material-or other types of plant material, or a lack of recognition that different diffusion apparatus or different methods yield juice or liquids having different pH values, or a lack of recognition that newer types of diffusers typically result in diffused juice that has lower pH values. To the extent that diffusion technology generates diffusion juice having different pH values using the same diffusion technology or different diffusion technology, or that improvements to diffusion technology have altered or reduced the pH value of diffusion juice, it can be understood that these conventional approaches to extracting juice from plant material teach away from the teaching of the invention.

As can be easily understood from the foregoing, the basic concepts of the present invention may be embodied in a variety of ways. It involves both analysis techniques as well as devices to accomplish the appropriate analysis. In this application, the analysis techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims herein included.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied for support of the claims of this application. It should be understood that any such language changes and broad claiming is herein accomplished. This full patent application is designed to support a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "injector" should be understood to encompass disclosure of the act of "injecting"—whether explicitly discussed or not—and, conversely, were there effectively disclosure of the act of "injecting", such a disclosure should be understood to encompass disclosure of a "injector" and even a "means for injecting." Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

| DOCUMENT NO | DATE | NAME | CLASS | SUBCLASS | FILING DATE |
| --- | --- | --- | --- | --- | --- |
| H1206 | Jul. 6, 1993 | Thibodeaux, et al. | 55 | 90 | Jan. 24, 1991 |
| 1,043,102 | Nov. 5, 1912 | Heesemann, et al. | | | Nov. 13, 1911 |
| 1,578,463 | Mar. 30, 1926 | Nicholson, et al. | | | Oct. 6, 1924 |
| 1,598,787 | Sep. 7, 1926 | Shields, et al. | | | Sep. 1, 1922 |
| 1,815,276 | Jul. 21, 1931 | Schwieger, et al. | | | Sep. 6, 1927 |
| 2,164,186 | Jun. 27, 1939 | Brown, et al. | | | May 3, 1937 |
| 2,547,298 | Apr. 3, 1951 | Wiklund | 127 | 50 | Dec. 27, 1943 |
| 2,557,800 | Jun. 19, 1951 | Seaillis, et al. | 127 | 52 | Jul. 30, 1947 |
| 2,697,049 | Dec. 14, 1954 | Breighel-Miiller | 127 | 50 | Jun. 3, 1949 |
| 2,757,582 | Aug. 7, 1956 | Freeman, et al. | 92 | 28 | Apr. 27, 1954 |
| 2,774,693 | Dec. 18, 1956 | Breighel-Miiller, et al. | 127 | 50 | Mar. 21, 1951 |
| 2,824,028 | Feb. 18, 1958 | Zenzes | 127 | 50 | Jan. 26, 1954 |
| 2,977,253 | Mar. 28, 1961 | Grandadam, et al. | 127 | 50 | Mar. 12, 1958 |
| 2,985,589 | May 23, 1961 | Broughton, et al. | 210 | 34 | May 22, 1957 |
| 3,007542 | Nov. 7, 1961 | Giampapa, et al. | 183 | 2.5 | Jun. 18, 1957 |
| 3,070,935 | Jan. 1, 1963 | De Leon | 55 | 170 | Aug. 10, 1959 |
| 3,089,789 | May 14, 1963 | Van Note, et al. | 127 | 50 | Mar. 23, 1959 |
| 3,113,044 | Dec. 3, 1963 | Alston | 127 | 48 | Mar. 17, 1961 |
| 3,168,419 | Feb. 2, 1965 | Gale | 127 | 50 | Jul. 24, 1961 |
| 3,201,919 | Aug. 24, 1965 | Long, et al. | 55 | 46 | May 23, 1962 |
| 3,358,425 | Dec. 19, 1967 | Burnham, Sr. | 55 | 193 | Jun. 14, 1966 |
| 3,618,589 | Mar. 16, 1970 | Tavani | 127 | 46 | Nov. 9, 1971 |
| 3,734,773 | May 22, 1973 | Haley | 127 | 48 | Aug. 2, 1971 |
| 3,785,863 | Jan. 15, 1974 | Devillers, et al. | 127 | 9 | Aug. 23, 1971 |
| 3,977,972 | Aug. 31, 1976 | Bloch, et al. | 210 | 63 R | Apr. 2, 1975 |
| 4,081,288 | Mar. 28, 1978 | Torres | 127 | 48 | Dec. 13, 1976 |
| 4,083,732 | Apr. 11, 1978 | Paley | 127 | 48 | Jan. 11, 1965 |
| 4,123,800 | Oct. 31, 1978 | Mazzei | 366 | 150 | May 18, 1977 |
| 4,140,541 | Feb. 20, 1979 | Popper | 127 | 46 | Mar. 25, 1977 |
| 4,182,633 | Jan. 8, 1980 | Ishikawa, et al. | 127 | 46 | Dec. 19, 1977 |
| 4,196,017 | Apr. 1, 1980 | Melville, et al. | 127 | 41 | Jan. 29, 1979 |

-continued

| DOCUMENT NO | DATE | NAME | CLASS | SUBCLASS | FILING DATE |
| --- | --- | --- | --- | --- | --- |
| 4,288,551 | Sep. 8, 1981 | Gudnason, et al. | 435 | 168 | Mar. 10, 1980 |
| 4,312,678 | Jan. 26, 1982 | Landis | 127 | 46.2 | Sep. 3, 1980 |
| 4,331,483 | May 25, 1982 | Mirabel, et al. | 127 | 46.2 | Nov. 18, 1980 |
| 4,332,622 | Jun. 1, 1982 | Hohnerlein, Jr., et al. | 127 | 41 | Aug. 25, 1980 |
| 4,345,947 | Aug. 24, 1982 | Rundell, et al. | 127 | 48 | Apr. 28, 1981 |
| 4,352,680 | Oct. 5, 1982 | Hackler | 55 | 48 | Jul. 19, 1979 |
| 4,382,823 | May 10, 1983 | Gudnason | 127 | 57 | Sep. 24, 1981 |
| 4,412,866 | Nov. 1, 1983 | Schoenrock, et al. | 127 | 46.2 | May 26, 1981 |
| 4,421,568 | Dec. 20, 1983 | Huibers | 127 | 48 | Aug. 26, 1981 |
| 4,432,806 | Feb. 21, 1984 | Madsen, et al. | 127 | 48 | Jan. 8, 1982 |
| 4,478,645 | Oct. 23, 1984 | Gudnason | 127 | 57 | Apr. 21, 1983 |
| 4,492,601 | Jan. 8, 1985 | Nakasone, et al. | 127 | 48 | Oct. 15, 1982 |
| 4,534,774 | Aug. 13, 1985 | Leccofre, et al. | 55 | 44 | Aug. 24, 1984 |
| 4,534,800 | Aug. 13, 1985 | Winstrom-Olsen | 127 | 12 | Nov. 23, 1983 |
| 4,785,794 | Nov. 22, 1988 | Jo, et al. | 127 | 46.1 | Jan. 20, 1987 |
| 4,795,494 | Jan. 3, 1989 | Toth, et al. | 127 | 48 | Mar. 14, 1988 |
| 5,102,553 | Apr. 7, 1992 | Kearney, et al. | 210 | 659 | Apr. 1, 1991 |
| 5,110,363 | May 5, 1992 | Clarke, et al. | 127 | 46.1 | Jan. 17, 1991 |
| 5,122,166 | Jun. 16, 1992 | Hyrcyk, et al. | 55 | 38 | Jul. 10, 1990 |
| 5,190,665 | Mar. 2, 1993 | Titmas, et al. | 210 | 743 | Aug. 12, 1991 |
| 5,202,032 | Apr. 13, 1993 | Shoemaker | 210 | 718 | Apr. 22, 1991 |
| 5,262,328 | Nov. 16, 1993 | Clarke, et al. | 436 | 17 | Jan. 2, 1992 |
| 5,314,613 | May 24, 1994 | Russo | 208 | 184 | Sep. 25, 1990 |
| 5,320,681 | Jun. 14, 1994 | Moc, et al. | 127 | 46.1 | Mar. 5, 1992 |
| 5,338,341 | Aug. 16, 1994 | Mazzei, et al. | 96 | 208 | Jun. 4, 1993 |
| 5,352,276 | Oct. 4, 1994 | Rentschler, et al. | 95 | 246 | Feb. 26, 1992 |
| 5,403,475 | Apr. 4, 1995 | Allen | 210 | 168 | Jan. 22, 1993 |
| 5,480,490 | Jan. 2, 1996 | Toth, et al. | 127 | 42 | Feb. 10, 1995 |
| 5,504,196 | Apr. 2, 1996 | Clarke Garegg, et al. | 536 | 17.2 | Sep. 8, 1993 |
| 5,614,086 | Mar. 25, 1997 | Hill, et al. | 210 | 170 | Jun. 5, 1995 |
| 5,674,312 | Oct. 7, 1997 | Mazzei | 95 | 261 | Mar. 26, 1996 |
| 5,759,283 | Jun. 2, 1998 | Ekern, et al. | 127 | 42 | May 14, 1996 |
| 5,846,333 | Dec. 8, 1998 | Partida, et al. | 127 | 37 | Mar. 12, 1996 |
| 5,865,899 | Feb. 2, 1999 | Theoleyre, et al. | 127 | 42 | May 29, 1996 |
| 5,928,429 | Jul. 27, 1999 | Duncan, et al. | 127 | 48 | Oct. 31, 1997 |
| 5,932,016 | Aug. 3, 1999 | Paananen, et al. | 127 | 48 | Nov. 14, 1994 |
| 6,051,075 | Apr. 18, 2000 | Kochergin, et al. | 127 | 42 | Nov. 15, 1996 |
| 6,123,750 | Sep. 26, 2000 | Espinal | 95 | 245 | Oct. 30, 1998 |
| 6,174,378 B1 | Jan. 16, 2001 | Donovan, et al. | 127 | 55 | Aug. 19, 1999 |
| 6,193,893 B1 | Feb. 27, 2001 | Mazzei, et al. | 210 | 702 | Sep. 23, 1999 |
| 6,277,175 | Aug. 21, 2001 | Halder, et al. | 95 | 246 | Apr. 27, 1999 |

James C. P. Chen and Chung ChiChou, "Cane Sugar Handbook: A Manual for Cane Sugar Manufactures and Their Chemists", 12th Edition (1993)
McGinnis, R. A, "Beet Sugar Technology" Third Edition (1982)
van der Poel, et al., "Sugar Technology, Beet and Cane Sugar Manufacture" (1998)

Thus, the applicant(s) should be understood to claim at least: i) each of the juice process systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed, xi) processes performed with the aid of or on a computer as described throughout the above discussion, xii) a programmable apparatus as described throughout the above discussion, xiii) a computer readable memory encoded with data to direct a computer comprising means or elements which function as described throughout the above discussion, xiv) a computer configured as herein disclosed and described, xv) individual or combined subroutines and programs as herein disclosed and described, xvi) the related methods disclosed and described, xvii) similar, equivalent, and even implicit variations of each of these systems and methods, xviii) those alternative designs which accomplish each of the functions shown as are disclosed and described, xix) those alternative designs and methods which accomplish each of the functions shown as are implicit to accomplish that which is disclosed and described, xx) each feature, component, and step shown as separate and independent inventions, xxi) the various combinations and permutations of each of the above, and xxii) each potentially dependent claim or concept as a dependency on each and every one of the independent claims or concepts presented.

It should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and U.S. Patent Law 35 U.S.C §132 or other such laws—to permit the addition of any of the various dependencies or other elements presented under one independent claim or concept as dependencies or elements under any other independent claim or concept.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

I claim:

1. A method of purifying juice obtained from plant material, comprising the steps of:
   a. obtaining plant material;
   b. removing juice from at least a portion of said plant material, wherein said juice contains sucrose, non-sucrose substances, and water, and wherein an amount of said non-sucrose substances comprise dissolved material;
   c. exposing said juice to a mixture of gases;
   d. transferring a portion of said dissolved material from said juice to said mixture of gases prior to addition of base;
   e. generating an increased interface surface area between said juice and said mixture of gases;
   f. increasing transfer rate of said dissolved material from said juice to said mixture of gases; and
   g. reducing said dissolved material within said juice.

2. A method of purifying juice obtained from plant material as described in claim 1, wherein said step of removing juice from at least a portion of said plant material comprises diffusing said plant material to obtain said juice.

3. A method of purifying juice obtained from plant material as described in claim 1, wherein said step of removing juice from at least a portion of said plant material comprises milling said plant material to obtain said juice.

4. A method of purifying juice obtained from plant material as described in claim 1, wherein said plant material is selected from the group consisting of sugarcane, sugar beets, and sweet sorghum.

5. A method of purifying juice obtained from plant material as described in claim 1, wherein said non-sucrose substances comprise at least one substance selected from the group consisting of insoluble plant material, soluble plant material, soil particles, fertilizer, saccharides other than sucrose, organic non-sugars, inorganic non-sugars, dissolved gases, organic acids, inorganic acids, proteins, phosphates, carbonate ions, bicarbonate ions, metal ions, pectins, coloring agents, saponins, wax, fats, and gums.

6. A method of purifying juice obtained from plant material as described in claim 1, wherein at least a portion of said dissolved material in said juice comprises volatile material.

7. A method of purifying juice obtained from plant material as described in claim 1, wherein said dissolved material in said juice comprises dissolved gases.

8. A method of purifying juice obtained from plant material as described in claim 7, wherein said dissolved gases in said juice are selected from the group consisting of carbon dioxide and sulfur dioxide.

9. A method of purifying juice obtained from plant material as described in claim 7, wherein dissolved gases in said juice comprise carbon dioxide in a form selected from the group consisting of carbon dioxide gas, carbonate ion, bicarbonate ion, and carbonic acid.

10. A method of purifying juice obtained from plant material as described in claim 7, wherein dissolved gases in said juice comprise sulfur dioxide in a form selected from the group consisting of sulfur dioxide gas, sulfuric acid, and sulfurous acid.

11. A method of purifying juice obtained from plant material as described in claim 1, wherein dissolved material comprises aqueous acids.

12. A method of purifying juice obtained from plant material as described in claim 11, wherein said aqueous acids are selected from the group consisting of phosphoric acid, hydrochloric acid, sulfuric acid, citric acid, oxalic acid, succinic acid, fumaric acid, lactic acid, glycolic acid, pyrrolidone-carboxylic acid, formic acid, acetic acid, butyric acid, maleic acid, and lactic acid.

13. A method of purifying juice obtained from plant material as described in claim 1, wherein said mixture of gases is selected from the group consisting of atmospheric gases, filtered atmospheric gases, air, and filtered air.

14. A method of purifying juice obtained from plant material as described in claim 1, wherein said step of increasing interface surface area between said juice and said mixture of gases comprises agitating said juice.

15. A method of purifying juice obtained from plant material as described in claim 1, wherein said step of increasing interface surface area between said juice and said mixture of gases comprises spraying said juice.

16. A method of purifying juice obtained from plant material as described in claim 1, wherein said step of increasing interface surface area between said juice and said mixture of gases comprises sparging said juice with said mixture of gases.

17. A method of purifying juice obtained from plant material as described in claim 1, wherein said step of increasing interface surface area between said juice and said mixture of gases comprises injecting said mixture of gases into said juice.

18. A method of purifying juice obtained from plant material as described in claim 1, wherein said step of increasing interface surface area between said juice and said mixture of gases comprises gas stripping said juice with said mixture of gases.

19. A method of purifying juice obtained from plant material as described in claim 1, wherein said steps of:
   c. exposing said juice to a mixture of gases;

d. transferring a portion of said dissolved material from said juice to said mixture of gases prior to addition of base;

e. increasing interface surface area between said juice and said mixture of gases;

f. increasing transfer rate of said dissolved material from said juice to said mixture of gases; and g. reducing dissolved material within said juice comprises injecting said mixture of gases into a stream of juice to form a mixed stream of said juice and said mixture of gases, whereby at least some of said dissolved material transfers from said stream of juice into said mixture of injected gases.

20. A method of purifying juice obtained from plant material as described in claim 19, wherein said stream of juice comprises a continuous stream of juice.

21. A method of purifying juice obtained from plant material as described in claim 20, wherein said mixed stream comprises a continuous mixed stream.

22. A method of purifying juice obtained from plant material as described in claim 21, further comprising the step of generating a reduced pressure on said mixed stream.

23. A method of purifying juice obtained from plant material as described in claim 22, further comprising the step of configuring said stream of juice to generate said reduced pressure on said mixed stream.

24. A method of purifying juice obtained from plant material as described in claim 19, further comprising the step of separating said dissolved material transferred to said mixture of gases from said mixed stream.

25. A method of purifying juice obtained from plant material as described in claim 24, further comprising the step of generating a gas flow of said mixture of gases separated from said mixed supply stream in response to a source of reduced pressure.

26. A method of purifying juice obtained from plant material as described in claim 19, further comprising the step of reducing the pressure on said interface surface area between said juice and said mixture of gases to less than atmospheric pressure.

27. A method of purifying juice obtained from plant material as described in claim 1, wherein said step of reducing said dissolved material within said juice comprises reducing concentration of hydronium ion in said juice.

28. A method of purifying juice obtained from plant material as described in claim 1, wherein said step of reducing said dissolved material within said juice comprises reducing capacity of said juice to generate hydronium ion.

29. A method of purifying juice obtained from plant material as described in claim 1, wherein said step of reducing said dissolved material within said juice further comprises raising the pH value of said juice an amount selected from the group consisting of 0.1 pH, 0.2 pH, 0.3 pH, 0.4 pH, 0.5 pH, 0.6 pH, 0.7 pH, 0.8 pH, 0.9 pH, 1.0 pH, 1.1 pH, 1.2, pH1.3, pH1.4, pH1.5, pH1.6, pH1.7, pH1.8, p1.9, 2.0 pH.

30. A method of purifying juice obtained from plant material as described in claim 29, further comprising the step of reducing the amount base added to a volume of said juice having reduced dissolved material to establish an initial pH value of between about 11.0 and about 12.0.

31. A method of purifying juice obtained from plant material as described in claim 29, further comprising the step of reducing the amount base added to a volume of said juice having reduced dissolved material to establish an initial pH value of between about 11.5 and about 12.5.

32. A method of purifying juice obtained from plant material as described in claim 29, further comprising the step of reducing the amount base added to a volume of said juice having reduced dissolved material to establish a pH value corresponding to an iso-electric point of at least a portion of said non-sucrose substances in said juice.

33. A method of purifying juice obtained from plant material as described in claim 1, wherein said step of reducing said dissolved material within said juice comprises reducing aqueous acids formed by dissolved gases in said juice.

34. A method of purifying juice obtained from plant material as described in claim 1, further comprises the step of removing at least a portion of insoluble materials from said juice prior to said step of exposing said juice to a mixture of gases.

35. A method of purifying juice obtained from plant material as described in claim 1, further comprises the step of removing at least a portion of insoluble materials from said juice after said step of exposing said juice to a mixture of gases.

36. A method of purifying juice obtained from plant material as described in claim 1, further comprises the step of adding a first amount of base to said juice after said step of reducing said dissolved material within said juice.

37. A method of purifying juice obtained from plant material as described in claim 36, wherein said step of adding a first amount of base to said juice after said step of reducing said dissolved material within said juice comprises the step of pre-liming said juice.

38. A method of purifying juice obtained from plant material as described in claim 36, wherein said step of adding a first amount of base to said juice after said step of reducing said dissolved material within said juice comprises the step of cold main liming said juice.

39. A method of purifying juice obtained from plant material as described in claim 36, wherein said step of adding a first amount of base to said juice after said step of reducing said dissolved material within said juice comprises hot main liming said juice.

40. A method of purifying juice obtained from plant material as described in claim 36, wherein said step of adding a first amount of base to said juice after said step of reducing said dissolved material within said juice comprises adding a reduced amount of base to said juice based upon reduction of said dissolved material within said juice.

41. A method of purifying juice obtained from plant material as described in claim 36, further comprising the step of adding a second amount of base to said juice after said step of reducing said dissolved material within said juice comprises the step of cold main liming said juice.

42. A method of purifying juice obtained from plant material as described in claim 41, wherein said step of adding a second amount of base to said juice after said step of reducing said dissolved material within said juice comprises the step of hot main liming said juice.

43. A method of purifying juice obtained from plant material as described in claim 41, wherein said step of adding a first amount of base to said juice after said step of reducing said dissolved material within said juice comprises adding a reduced amount of base to said juice based upon reduction of said dissolved material within said juice.

44. A method of purifying juice obtained from plant material as described in claim 41, further comprising the step of adding a third amount of base to said juice after said step of reducing said dissolved material within said juice comprises the step of hot main liming said juice.

45. A method of purifying juice obtained from plant material as described in claim 44, wherein said step of adding a third amount of base to said juice after said step of reducing said dissolved materials within said juice comprises the step of intermediate liming said juice.

46. A method of purifying juice obtained from plant material as described in claim 44, further comprising adding a fourth amount of base to said juice after said step of reducing said dissolved material within said juice.

47. A method of purifying juice obtained from plant material as described in claim 44, further comprising the step of carbonating said juice with a third amount of gas.

48. A method of purifying juice obtained from plant material as described in claim 47, wherein said gas is selected from the group consisting of atmospheric gases, air, and carbon dioxide.

49. A method of purifying juice obtained from plant material as described in claim 47, further comprising the step of forming precipitates from said base and said third amount of gas.

50. A method of purifying juice obtained from plant material as described in claim 49, further comprises the step of trapping at least a portion of said non-sucrose substances in said juice with said precipitates.

51. A method of purifying juice obtained from plant material as described in claim 50, further comprises the step of separating said precipitates trapping said non-sucrose substances from said juice.

52. A method of purifying juice obtained from plant material as described in claim 51, further comprises the step of reducing the amount of water in said juice.

53. A method of purifying juice obtained from plant material as described in claim 52, further comprises the step of crystallizing sucrose in said juice.

54. A method of purifying juice obtained from plant material as described in claim 41, further comprising the step of carbonating said juice with a second amount of gas.

55. A method of purifying juice obtained from plant material as described in claim 54, wherein said gas is selected from the group consisting of atmospheric gases, air, and carbon dioxide.

56. A method of purifying juice obtained from plant material as described in claim 54, further comprising the step of forming precipitates from said base and said second amount of gas.

57. A method of purifying juice obtained from plant material as described in claim 56, further comprises the step of trapping at least a portion of said non-sucrose substances in said juice with said precipitates.

58. A method of purifying juice obtained from plant material as described in claim 57, further comprises the step of separating said precipitates trapping said non-sucrose substances from said juice.

59. A method of purifying juice obtained from plant material as described in claim 58, further comprises the step of reducing the amount of water in said juice.

60. A method of purifying juice obtained from plant material as described in claim 59, further comprises the step of crystallizing sucrose in said juice.

61. A method of purifying juice obtained from plant material as described in claim 36, wherein said base is selected from the group consisting of calcium oxide, calcium hydroxide and milk of lime.

62. A method of purifying juice obtained from plant material as described in claim 36, further comprising the step of carbonating said juice with a first amount of gas.

63. A method of purifying juice obtained from plant material as described in claim 62, wherein said first amount gas is selected from the group consisting of atmospheric gases, air, and carbon dioxide,.

64. A method of purifying juice obtained from plant material as described in claim 62, further comprising the step of forming precipitates from said base and said first amount of gas.

65. A method of purifying juice obtained from plant material as described in claim 64, further comprises the step of trapping at least a portion of said non-sucrose substances in said juice with said precipitates.

66. A method of purifying juice obtained from plant material as described in claim 65, further comprises the step of separating said precipitates trapping said non-sucrose substances from said juice.

67. A method of purifying juice obtained from plant material as described in claim 66, further comprises the step of reducing the amount of water in said juice.

68. A method of purifying juice obtained from plant material as described in claim 67, further comprises the step of crystallizing sucrose in said juice.

* * * * *